United States Patent
Tawata et al.

(10) Patent No.: US 12,491,530 B2
(45) Date of Patent: Dec. 9, 2025

(54) PAINTING ROBOT

(71) Applicant: ABB Schweiz AG, Baden (CH)

(72) Inventors: Takahiro Tawata, Tokyo (JP); Norio Umezawa, Tokyo (JP); Kisumi Iida, Tokyo (JP)

(73) Assignee: ABB SCHWEIZ AG, Baden (CH)

( * ) Notice: Subject to any disclaimer, the term of this patent is extended or adjusted under 35 U.S.C. 154(b) by 449 days.

(21) Appl. No.: 18/186,909

(22) Filed: Mar. 20, 2023

(65) Prior Publication Data

US 2023/0338976 A1 Oct. 26, 2023

(30) Foreign Application Priority Data

Mar. 28, 2022 (JP) ................................. 2022-052326

(51) Int. Cl.
   *B25J 11/00* (2006.01)
   *B05B 12/08* (2006.01)
   *B05B 13/04* (2006.01)

(52) U.S. Cl.
   CPC ........ *B05B 12/087* (2013.01); *B05B 13/0431* (2013.01); *B05B 13/0452* (2013.01); *B25J 11/0075* (2013.01)

(58) Field of Classification Search
   None
   See application file for complete search history.

(56) References Cited

U.S. PATENT DOCUMENTS

| | | | | |
|---|---|---|---|---|
| 9,079,304 B2 * | 7/2015 | Kim | ........................ | B25J 9/1651 |
| 9,242,265 B2 * | 1/2016 | Hedges | ................... | B05C 5/002 |
| 9,962,722 B1 * | 5/2018 | Sute | ..................... | B05C 11/1044 |
| 10,300,503 B2 * | 5/2019 | Mori | ........................ | B05D 1/02 |
| 10,464,095 B2 * | 11/2019 | Fritz | ..................... | B05B 12/084 |
| 10,513,856 B2 * | 12/2019 | Telleria | ................ | B25J 11/0075 |
| 10,583,565 B2 * | 3/2020 | Miyamoto | ........... | B25J 11/0075 |
| 10,940,691 B2 * | 3/2021 | Daniels | ................... | B41J 25/308 |
| 11,052,687 B2 * | 7/2021 | Daniels | ................... | B41J 25/001 |
| 11,845,095 B2 * | 12/2023 | Rodrigues | ............... | B05B 1/086 |
| 11,878,317 B2 * | 1/2024 | Fritz | ........................ | B05D 1/02 |
| 11,896,985 B2 * | 2/2024 | Le Strat | ................ | B05B 12/082 |
| 11,944,990 B2 * | 4/2024 | Fritz | .................... | B05B 13/0452 |
| 12,194,636 B2 * | 1/2025 | Utsunomiya | ............ | B25J 9/163 |
| 12,285,867 B2 * | 4/2025 | Nienaber | ............. | B25J 11/0065 |
| 12,304,055 B2 * | 5/2025 | Tobkin | ................. | B25J 11/0075 |

(Continued)

FOREIGN PATENT DOCUMENTS

| | | |
|---|---|---|
| JP | H06-134376 A | 5/1994 |
| JP | 2000-126666 A | 5/2000 |

(Continued)

*Primary Examiner* — Jethro M. Pence
(74) *Attorney, Agent, or Firm* — GREENBERG TRAURIG, LLP

(57) ABSTRACT

A painting robot capable of reducing the influence of pressure fluctuations when paint is discharged or stopped. The painting robot includes a robot arm having a painting head unit attached to its tip, a paint supply mechanism provided between robot arm and painting head unit; and a control unit. The paint supply mechanism includes a paint circulation channel; paint transfer means and regulating valves provided in the middle of the paint circulation channel. The control unit is configured with a feedback control unit that calculates a pressure calculation value for executing feedback control.

19 Claims, 11 Drawing Sheets

(56) References Cited

U.S. PATENT DOCUMENTS

| | | | |
|---|---|---|---|
| 12,325,035 B2* | 6/2025 | Asadi | B05B 15/555 |
| 2010/0260531 A1 | 10/2010 | Rademacher | |
| 2016/0016186 A1* | 1/2016 | Hofschulte | B05B 12/02 |
| | | | 901/43 |
| 2019/0001364 A1* | 1/2019 | Antolotti | C23C 4/129 |
| 2019/0193421 A1 | 6/2019 | Heere et al. | |
| 2019/0337001 A1 | 11/2019 | Fritz et al. | |
| 2020/0078812 A1* | 3/2020 | Shi | B41J 3/4073 |
| 2020/0247158 A1 | 8/2020 | Daniels et al. | |
| 2020/0406649 A1 | 12/2020 | Daniels et al. | |
| 2022/0226995 A1* | 7/2022 | Beck | B25J 9/1641 |
| 2022/0227002 A1* | 7/2022 | Kouno | B25J 11/0075 |
| 2022/0274419 A1 | 9/2022 | Hozumi et al. | |
| 2022/0402136 A1* | 12/2022 | Zhang | B25J 9/1697 |
| 2023/0134252 A1* | 5/2023 | Tawata | B41J 2/19 |
| | | | 239/71 |
| 2023/0286291 A1* | 9/2023 | Kumagai | B41J 29/393 |
| 2023/0338976 A1* | 10/2023 | Tawata | B41J 2/14209 |

FOREIGN PATENT DOCUMENTS

| | | |
|---|---|---|
| JP | 2016-175077 A | 10/2016 |
| JP | 2017-035691 A | 2/2017 |
| JP | 2017-035692 A | 2/2017 |
| JP | 2017-035693 A | 2/2017 |
| JP | 2020-124912 A | 8/2020 |
| JP | 2021-003883 A | 1/2021 |
| JP | 6979546 B1 | 12/2021 |
| WO | 2021040034 A1 | 3/2021 |
| WO | 2021069885 A1 | 4/2021 |
| WO | 2022049718 A1 | 3/2022 |

* cited by examiner

Fig.13
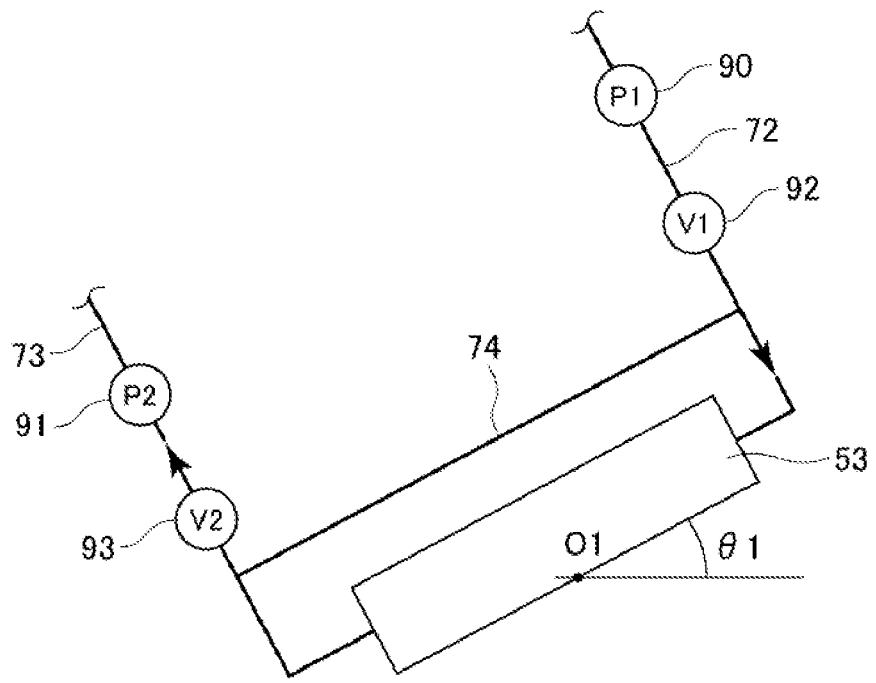
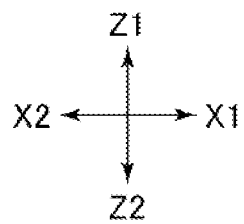

PAINTING ROBOT

CROSS-REFERENCE TO RELATED APPLICATIONS

This application claims priority to Japanese patent application Serial No.: 2022-052326, filed on Mar. 28, 2022; which is herein incorporated by reference in its entirety.

TECHNICAL FIELD

The present invention relates to painting robots.

BACKGROUND ART

Robotic painting is the mainstream in the painting line of vehicles such as automobiles. As an example of this robotic painting configuration, for example, Patent Literature 1 discloses the following configuration: That is, in the painting robot disclosed in Patent Literature 1, a circulation device (200) is attached to the tip side of the robot arm (100). A first proportional control valve (204) and a second proportional control valve (205) are provided in the circulation device (200), a plurality of pressure sensors (208 to 211) are provided, and a flow meter (212) is provided. In addition, the supply pressure and recovery pressure are adjusted by controlling the openness of the first proportional control valve (204) and the second proportional control valve (205) according to the control mode of whether the flow rate is constant or the differential pressure is constant when the attitude of the circulation device (200) changes, thereby realizing control according to the above control mode.

PRIOR ART LITERATURE

Patent Literature

[Patent Literature 1] WO2021/040034 Publication

SUMMARY OF INVENTION

Problem to be Solved by the Invention

By the way, in the above-mentioned Patent Reference 1 configuration, measurement results of pressure sensors and flow meters are sent to the processor. Thus, for example, when paint is dispensed or stopped, the responsiveness of the pump or proportional control valve (paint regulator) is delayed, and the delayed responsiveness causes pressure fluctuations. When such pressure fluctuations occur, there are many cases where the paint pressure does not fall within the range of the reference pressure.

The present invention is based on the above circumstances and is intended to provide a painting robot capable of reducing the effects of pressure fluctuations upon dispensing or stopping dispensing of paint.

Means for Solving the Problem

In order to solve the above problems, according to the first aspect of the present invention, provided is a painting robot for painting a vehicle, the painting robot comprising a painting head unit comprising a painting head comprising a plurality of nozzles for ejecting paint droplets; a robot arm in which the tip thereof is mounted with a painting head unit and for moving the painting head to a desired position; a paint supply mechanism disposed between the robot arm and the painting head unit; and a control unit for controlling the drive of the robot arm and the paint supply mechanism; where the paint supply mechanism comprises a paint circulation channel disposed between the robot arm and the painting head unit to recover the paint not dispensed from the painting head while supplying the paint to the painting head; a paint transfer means disposed in the middle of the paint circulation channel and providing and recovering the paint between a reservoir site of the paint and the painting head; and a regulating valve disposed midway through the paint circulation channel and adjustable to open and close an internal flow path of the paint circulation channel; and the control unit comprises a control memory in which the pressure set point is stored; and a feedback control unit for controlling the operation of at least one of the paint transfer means and the regulating valve by calculating a pressure calculation value for executing feedback control of the operation of at least one of the paint transfer means and the regulating valve, so as to be the pressure set point read from the control memory; and a feedforward control unit for controlling the operation of at least one of the paint transfer means and the regulating valve, by correcting the calculated pressure calculation value with a compensating pressure value in the opposite direction to the expected pressure fluctuation with respect to the pressure set point, based on the trigger signal related to the change of state of the painting head.

Further, in the above invention, the paint circulation channel preferably comprises a paint supply channel for providing paint to the painting head; a return channel connected to a paint discharge side of the painting head to recover the paint not dispensed from the nozzle; and the paint transfer means preferably comprises a paint supply means mounted at a predetermined position on the robot arm and disposed midway through the paint supply channel and applying pressure to supply the paint to the painting head based on control at the control unit; and a paint recovery means mounted in a predetermined position of the robot arm and disposed midway through the return channel and applying pressure downstream of the return channel to recover the paint not dispensed from the painting head based on control at the control; and the feedforward control unit preferably operates the paint supply means, by correcting the calculated pressure calculation value with the compensating pressure value for correcting the paint supply means to increase the driving force, based on the trigger signal related to the start of discharge of the paint from the painting head from the discharge stop state of the paint from the painting head.

Further, in the above invention, it is preferable that the feedforward control unit operates the paint recovery means, by correcting the calculated pressure calculation value with the compensating pressure value for correcting the paint recovery means to decrease the driving force, based on the trigger signal related to the start of discharge of the paint from the discharge stop state from the painting head.

Further, in the above invention, the feedforward control unit preferably operates the paint supply means, by correcting the calculated pressure calculation value with the compensating pressure value for correcting the paint supply means to increase the driving force, based on the trigger signal related to the stoppage of discharge from the discharge state of the paint from the painting head.

Further, in the above invention, it is preferable that the feedforward control unit operates the paint recovery means, by correcting the calculated pressure calculation value with the compensating pressure value for correcting the paint recovery means to increase the driving force, based on the trigger signal related to the stoppage of discharge from the discharge state of the paint from the painting head.

Further, in the above invention, the regulating valve preferably comprises a first regulating valve provided downstream of the paint supply channel rather than the paint supply means and adjusting a pressure of the paint towards the painting head based on control at the control unit; and a second regulating valve provided upstream of the return channel rather than the paint recovery means and adjusting a pressure of paint recovered from the painting head based on control at the control unit; and the feedforward control unit preferably corrects the calculated pressure calculation value with the compensating pressure value to control the operation of at least one of the first regulating valve and the second regulating valve, based on the trigger signal related to the start of discharge from the discharge stop state or the stop of discharge from the discharge state of paint from the painting head.

Further, in the above invention, it is preferable that the feedforward control unit operates the first regulating valve, by correcting the calculated pressure calculation value with the compensating pressure value for correcting to opens the first regulating valve, based on the trigger signal related to the start of discharge of the paint from the painting head from the discharge stop state of the paint.

Further, in the above invention, it is preferable that the feedforward control unit operates the second regulating valve, by correcting the calculated pressure calculation value with the compensating pressure value for correcting to close the second regulating valve, based on the trigger signal related to the start of discharge of the paint from the painting head from the discharge stop state of the paint.

Further, in the above invention, it is preferable that the feedforward control unit operates the first regulating valve, by correcting the calculated pressure calculation value with the compensating pressure value for correcting to close the first regulating valve, based on the trigger signal related to the stoppage of discharge from the discharge state of the paint from the painting head.

Further, in the above invention, it is preferable that the feedforward control unit operates the second regulating valve, by correcting the calculated pressure calculation value with the compensating pressure value for correcting to open the second regulating valve, based on the trigger signal related to the stoppage of discharge from the discharge state of the paint from the painting head.

Further, in the above invention, the feedforward control unit preferably controls the operation of at least one of the paint transfer means and the regulating valve, by correcting the calculated pressure calculation value with a compensating pressure value in the opposite direction to the expected pressure fluctuation with respect to the pressure set point, based on the trigger signal related to the change of posture of the painting head.

Effect of the Invention

According to the present invention, it is possible to provide a painting robot capable of reducing the influence of pressure fluctuations when paint is discharged or stopped.

BRIEF DESCRIPTION OF THE DRAWINGS

FIG. 13 A diagram showing the painting robot shown in FIG. 1 with the painting head tilted in a direction orthogonal to the direction of the painting path.

BEST MODE FOR CARRYING OUT THE INVENTION

A painting robot 10 according to each embodiment of the present invention will be described below with reference to the drawings. In the following description, if necessary, the X direction is the longitudinal direction of the nozzle forming surface 52 (painting head 53), the X1 side is the right side in FIG. 2, and the X2 side is the left side in FIG. 2. The Y direction is the short direction (width direction) of the nozzle forming surface 52 (painting head 53), the Y1 side is the upper side of the paper surface in FIG. 2, and the Y2 side is the lower side of the paper surface in FIG. 2.

The painting robot 10 of the present embodiment is intended to "paint" an object, such as a vehicle or vehicle part located on a painted line in a car manufacturing plant (hereinafter described as a vehicle as well as a vehicle part of the vehicle), and to form a coating film on the surface of the painted object to provide protection and aesthetics to the surface. Therefore, it is necessary to paint vehicles moving along the painting line at predetermined time intervals with a desired painting quality within a certain period of time.

In addition, in the painting robot 10 of the present embodiment, not only the above-described coating film can be formed, but various designs and images can be formed for painted objects such as vehicles and vehicle parts. It should be noted that the subject matter of painting is not limited to vehicles and vehicle parts, but it is acceptable if it is necessary to paint various parts other than automobiles (for example, exterior parts of airplanes and railways).

(1-1. Overall Configuration of Inkjet Coating Machines for Vehicles)

Figure 1:
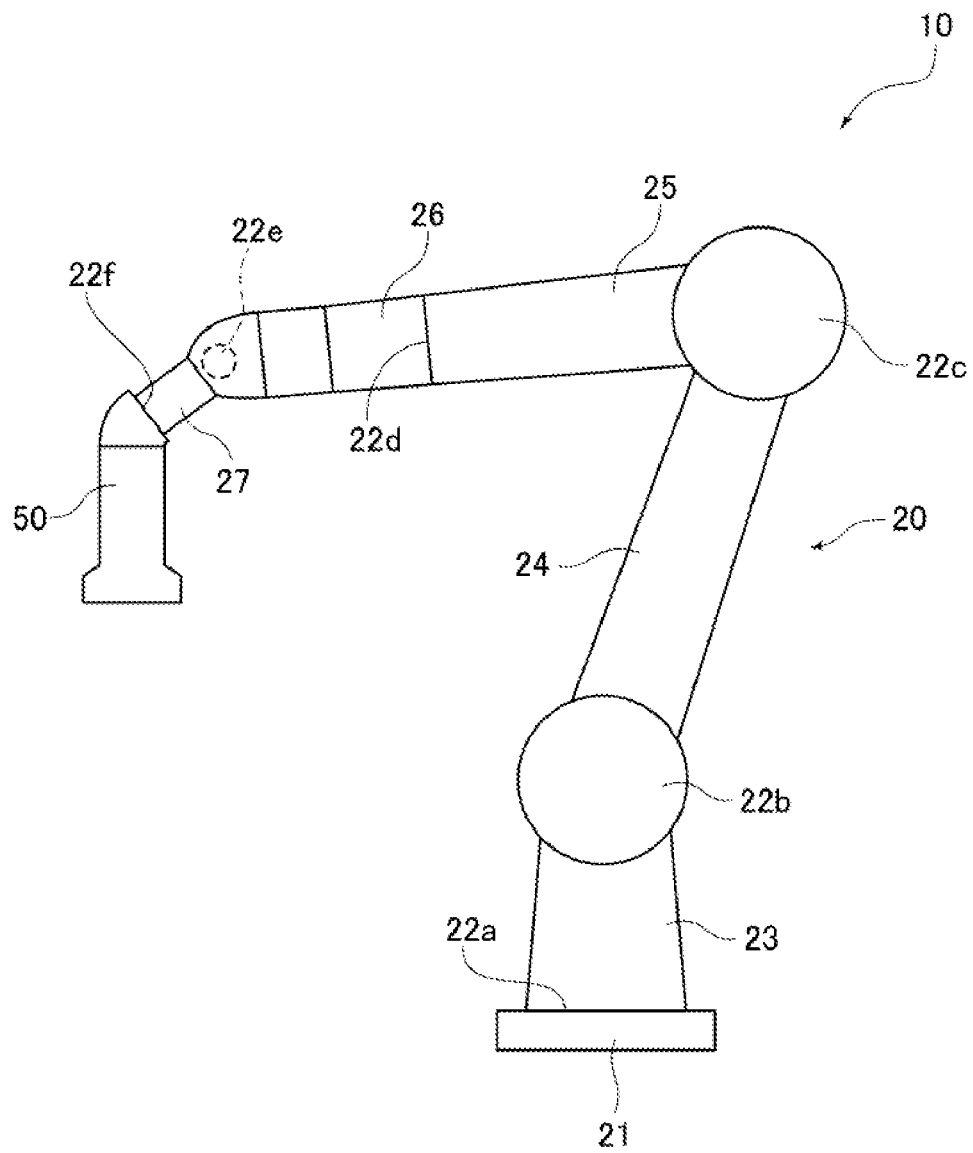
FIG. 1 A schematic diagram showing the overall configuration of a painting robot according to one embodiment of the present invention.

FIG. 1 is a schematic diagram illustrating an overall configuration of a painting robot 10 according to the first embodiment of the present invention. As shown in FIG. 1, the painting robot 10 has a robot main body 20 and a painting head unit 50 as main components. Although the painting robot 10 shown in FIG. 1 shows a six-axis vertical articulation robot as an example thereof, the painting robot 10 may be any type of robot, such as a non-six-axis vertical articulation, horizontal articulation, orthogonal robot, etc.

(1-2. About the Main Body of Painting Equipment)

As shown in FIG. 1, the robot main body 20 uses base 21, rotational first-sixth axes 22a-22f, legs 23, first rotating arm 24, second rotating arm 25, rotating arm 26, wrist portion 27, and an unillustrated motor for driving them as the main components. The portion from the leg 23 to the wrist portion 27 corresponds to the robot arm R1, but other portions such as the base 21, etc. may also correspond to the robot arm R1.

Among these, the base 21 is a portion to be installed on an installation site such as a floor surface, but the base 21 may be movable with respect to the installation site. Also, the leg portion 23 is a portion erected upward from the base 21, and is rotated with respect to the base 21 via the first rotational axis 22a by being driven by a motor (first motor) not shown. In addition, the leg portion 23 may be configured so as not to rotate with respect to the base 21.

Also, at the upper end of the leg 23, the first rotating arm 24 is rotatably provided via the second rotational axis 22b by a drive of the motor (second motor) which is omitted from the illustration. Further, on the tip side of the first rotating arm 24, the second rotating arm 25 is rotatably provided via the third rotational axis 22c by means of a drive of the motor (third motor), which is omitted in the illustration.

Also, on the tip side of the second rotating arm 25, the rotation arm 26 is rotatably provided about the center axis of the second rotating arm 25. This rotating arm 26 is rotatable via a fourth rotational axis 22d by driving a motor (fourth motor) that is omitted from the illustration. In addition, a wrist portion 27 is provided on the tip side of the rotating arm 26. This wrist portion 27 allows for rotational movement around multiple (e.g., two) axes of different orientations. In FIG. 1, the rotational axis capable of rotational movement thereof is set to a fifth rotational axis 22e and a sixth rotational axis 22f, respectively. As a result, the orientation of the painting head unit 50 can be controlled with high accuracy. It should be noted that the number of axes may be any number as long as it is two or more.

In addition, a painting head unit 50 is attached to the wrist portion 27, but the painting head unit 50 may be provided detachably from the wrist portion 27.

(1-3. About Painting Head Unit)

Figure 2:
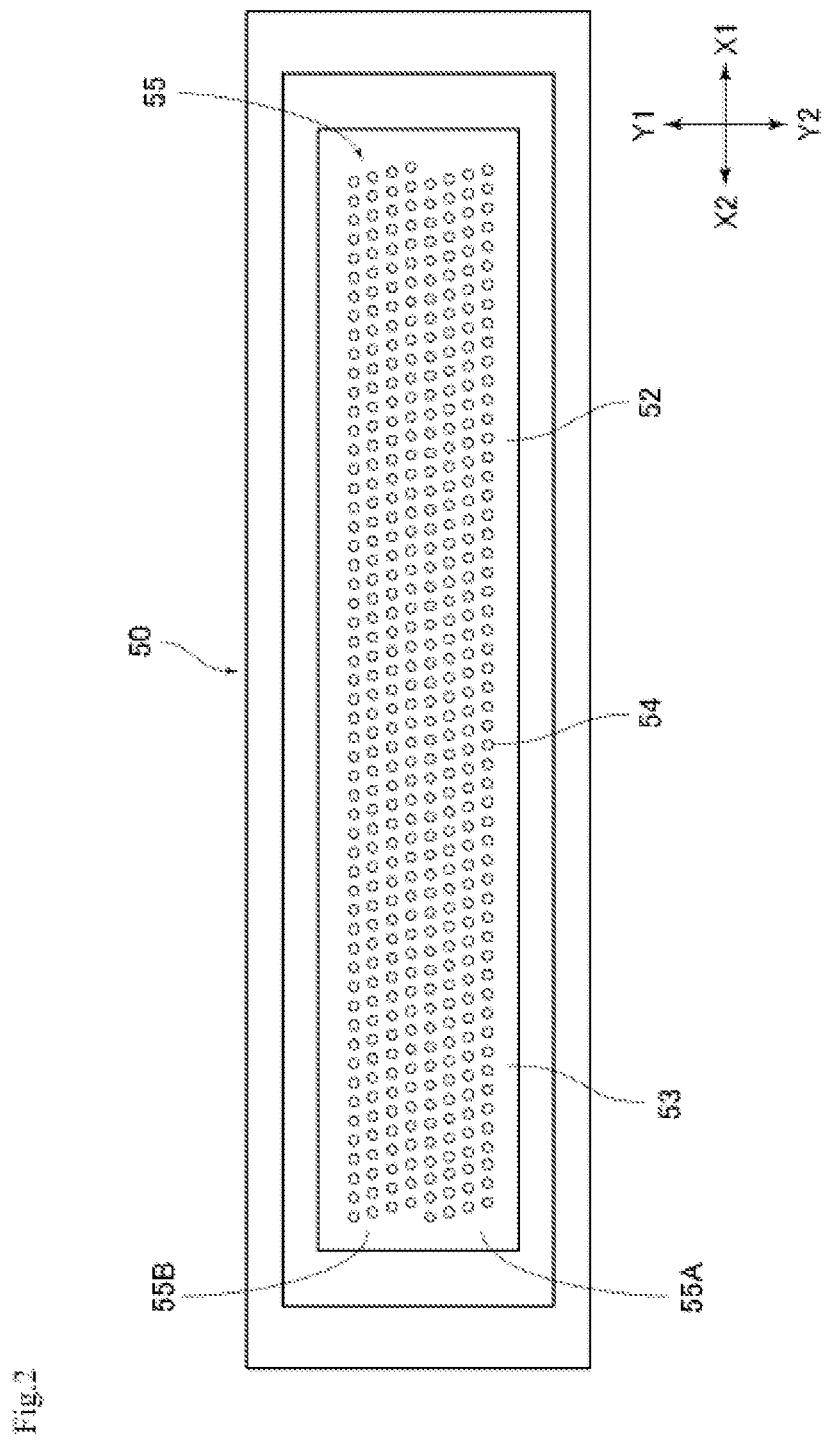
FIG. 2 A diagram showing the nozzles forming surface for ejecting paint from among the painting robots shown in FIG. 1.

The painting head unit 50 will then be described. FIG. 2 is a diagram illustrating a front view of a nozzle forming surface 52 for dispensing paint out of the painting head unit 50. As shown in FIG. 2, the painting head unit 50 comprises a head cover (not shown), and various components are built in the head cover. As shown in FIG. 2, the nozzle forming surface 52 is provided with a plurality of nozzle rows 55 in which the nozzles 54 are inclined relative to the longitudinal direction of the painting head unit 50. Such a nozzle row 55 is provided in the present embodiment with a first nozzle row 55A present on one side (Y2 side) of the main scanning direction (Y direction) and a second nozzle row 55B present on the other side (Y1 side) of the main scanning direction.

Note that when the paint is to be ejected, the drive timing of each nozzles 54 is controlled such that between droplets ejected from the adjacent nozzles 54 in the first nozzle row 55A, droplets ejected from the nozzles 54 in the second nozzle row 55B are expelled. As a result, the dot density can be improved painting.

Figure 3:
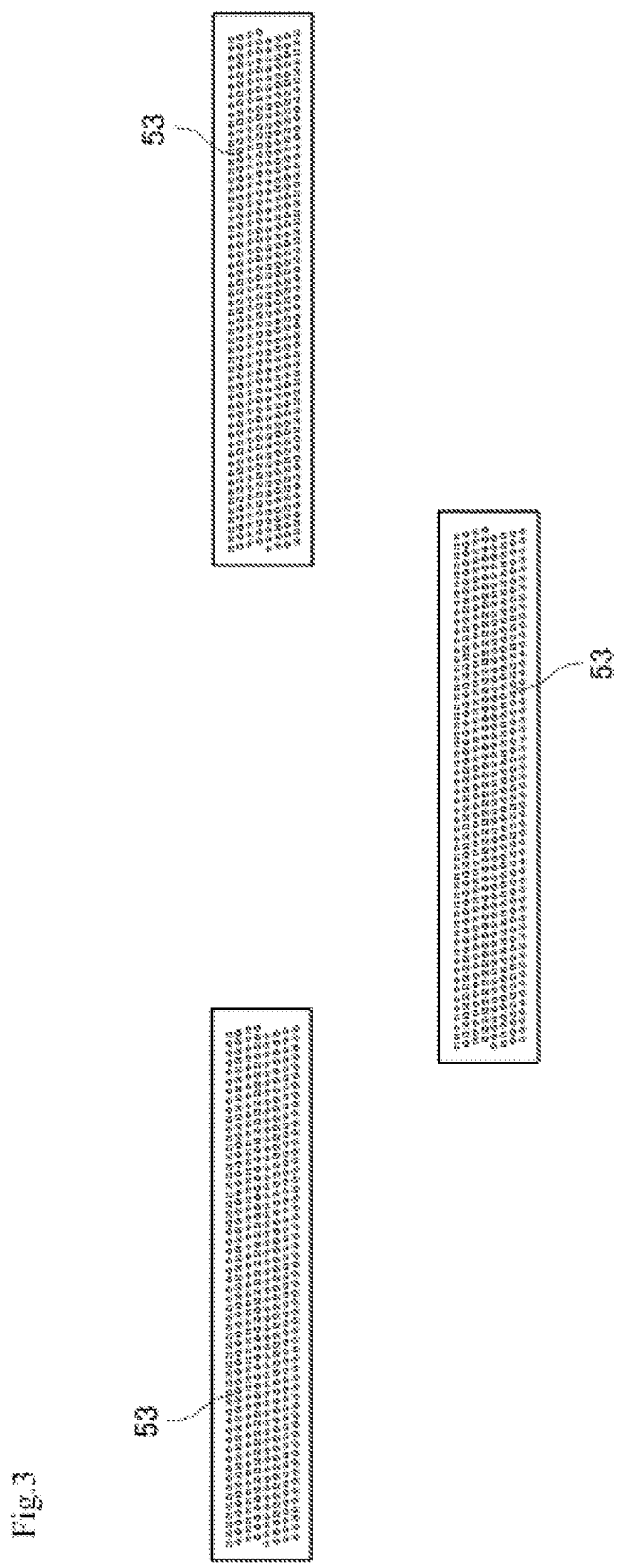
FIG. 3 A diagram showing the state in which multiple painting heads are arranged in a staggered shape in the painting robot shown in FIG. 1.

By the way, as shown in FIG. 2, there is a single painting head 53 in the nozzle forming surface 52. However, the nozzle forming surface 52 may have a head group consisting of a plurality of painting heads 53. In this case, the configuration of positioning of the plurality of painting heads 53 in a staggered manner while aligning the painting heads as shown in FIG. 3 can be offered as an example but the arrangement of the painting heads 53 in the head group may not be staggered.

Figure 4:
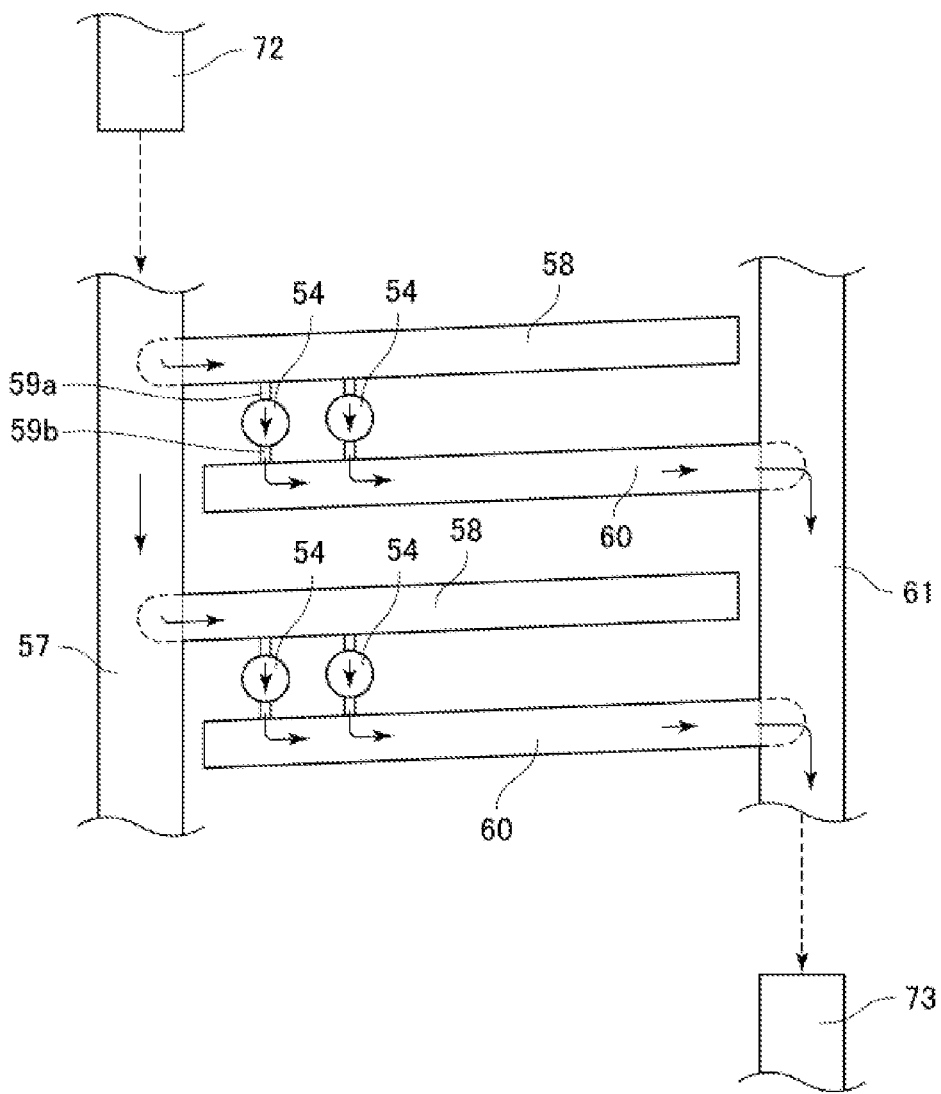
FIG. 4 A diagram showing a schematic configuration of supplying paint to each nozzle in the painting robot shown in FIG. 1.
Figure 5:
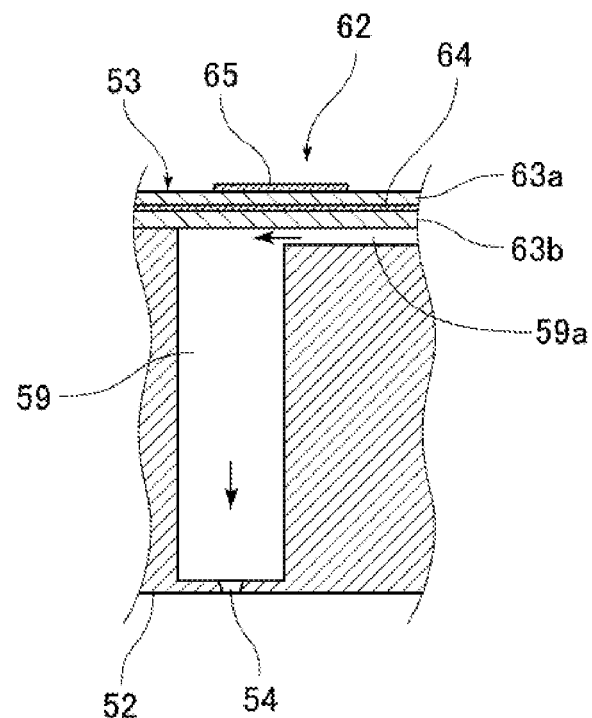
FIG. 5 A cross-sectional view showing the configuration near the row-directed supply channel, nozzle pressurization chamber, and row-directed discharge channel shown in FIG. 4.

FIG. 4 is a diagram illustrating a schematic configuration of providing paint to each nozzles 54. FIG. 5 is a cross-sectional view showing a configuration near a row-directed supply channel 58, nozzle pressurization chamber 59, and a row-directed discharge channel 60. As shown in FIGS. 4 and 5, the painting head 53 includes a supply side major channel 57, a row-directed supply channel 58, a nozzle pressurization chamber 59, a row-directed discharge channel 60, and a discharge side major channel 61. The supply side major channel 57 is a channel through which paint is supplied from the paint supply channel 72 of the paint supply mechanism 70 described below. Also, row-directed supply channel 58 is a channel in which the paint in the supply side major channel 57 is diverted.

The nozzle pressurization chamber 59 is also connected via a row-directed supply channel 58 and a nozzle supply channel 59a. Thereby, the nozzle pressurization chamber 59 is supplied with the paint from the row feeding channel 58. This nozzle pressurization chamber 59 is provided corresponding to the number of nozzles 54 and the internal paint can be ejected from the nozzles 54 using the piezoelectric substrate 62 described below.

The nozzle pressurization chamber 59 is also connected to the row-directed discharge channel 60 via the nozzle discharge channel 59b. Thus, the paint not dispensed from the nozzles 54 is discharged from within the nozzle pressurization chamber 59 into the row-directed discharge channel 60 via the nozzle discharge channel 59b. The row-directed discharge channel 60 is also connected to the discharge side major channel 61. The discharge side major channel 61 is a channel through which the discharged paint merges from the respective row-directed discharge channel 60. This discharge side major channel 61 is connected to a return channel 73 of the paint supply mechanism 70 as described below.

With such a configuration, the paint supplied from the paint supply channel 72 of the paint supply mechanism 70 described below is ejected from the nozzles 54 via the supply side major channel 57, the row-directed supply channel 58, the nozzle supply channel 59a and the nozzle pressurization chamber 59. The paint not dispensed from nozzles 54 is also returned from the nozzle pressurization chamber 59 through nozzle discharge channel 59b, row-directed discharge channel 60 and discharge side major channel 61 to return channel 73 of the paint supply mechanism 70 as described below.

In the configuration shown in FIG. 4, one row-directed supply channel 58 is arranged such that one row-directed discharge channel 60 corresponds. However, one row-directed supply channel 58 may be arranged such that multiple (e.g., two) row-directed discharge channels 60 correspond. Also, one row-directed discharge channel 60 may be arranged so as to correspond to a plurality of row-directed supply channels 58.

Also, as shown in FIG. 5, a piezoelectric substrate 62 is disposed on the top surface of the nozzle pressurization chamber 59 (the side opposite the nozzles 54). The piezoelectric substrate 62 comprises two piezoelectric ceramic layers 63a, 63b, which are piezoelectrics, and further comprises a common electrode 64 and an individual electrode 65. The piezoelectric ceramic layers 63a, 63b are stretchable members by applying a voltage from the outside. As such piezoelectric ceramic layers 63a, 63b, ceramic materials such as lead zirconate titanate (PZT)-based, NaNbO3-based, BaTiO3-based, (BiNa)NbO3-based, BiNaNb5O15-based can be used with ferroelectric properties.

Also, as shown in FIG. 5, a common electrode 64 is disposed between the piezoelectric ceramic layer 63a and the piezoelectric ceramic layer 63b. In addition, a surface electrode (not shown) for a common electrode is formed on the top surface of the piezoelectric substrate 62. The common electrode 64 and the surface electrode for common electrode are electrically connected through a conductor (not shown) present in the piezoelectric ceramic layer 63a. The individual electrodes 65 are also each disposed at a site opposite the nozzle pressurization chamber 59 described above. Furthermore, the portion of the piezoelectric ceramic layer 63a sandwiched between the common electrode 64 and the individual electrode 65 is polarized in the thickness direction. Therefore, upon application of voltage to the individual electrodes 65, the piezoelectric effect distorts the piezoelectric ceramic layer 63a. Therefore, applying a predetermined drive signal to the individual electrodes 65 causes the piezoelectric ceramic layer 63b to fluctuate relatively to reduce the volume of the nozzle pressurization chamber 59, thereby ejecting the paint.

Although the common electrode 64 is disposed on the top surface of the nozzle pressurization chamber 59 in FIG. 5, the common electrode 64 is not limited to the configuration disposed on the top surface of the nozzle pressurization chamber 59 as shown in FIG. 5. For example, the common electrode 64 may adopt a configuration in which it is arranged on the side surface of the nozzle pressurizing chamber 59 (a surface orthogonal or substantially orthogonal to the top surface). In addition, any configuration may be adopted as long as the paint can be discharged well from the nozzles 54.

(1-4. Other Configurations of Painting Head Units)

Figure 6:
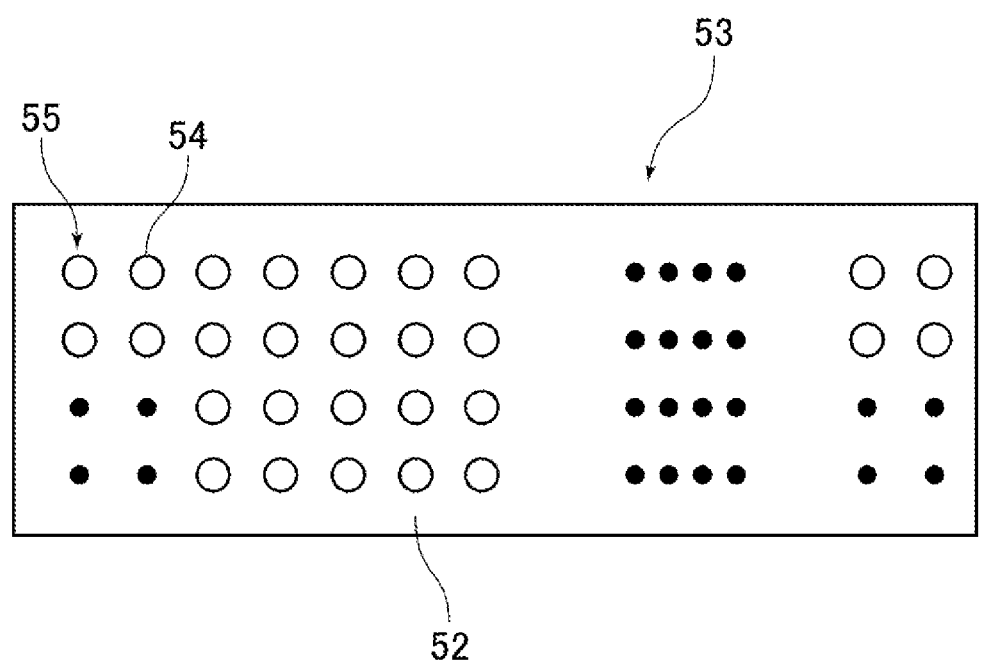
FIG. 6 A plan view showing the configuration of the nozzle forming surface in other painting head units different from the painting head unit shown in FIG. 2.

Other configurations of the painting head unit 50 will now be described. FIG. 6 is a plan view illustrating the configuration of the nozzle forming surface 52 of other painting head units 50. As shown in FIG. 6, multiple nozzles 54 may be aligned along the short direction (width direction; Y direction) of the painting head 53 to configure the nozzle row 55. Although in the configuration shown in FIG. 6, the plurality of nozzles 54 constitutes a row of nozzles 55 in line with the short direction (width direction; main scanning direction) of the painting head 53, only one (single) nozzles 54 may be arranged in the short direction (width direction; main scanning direction) of the painting head 53. That is, the nozzle row 55 may be comprised of one nozzles 54.

Also, when painting the vehicle with the painting head 53 as shown in FIG. 6, the painting may be performed with the longitudinal direction of the painting head 53 slightly tilted relative to the main scanning direction of the painting head 53. For example, in the configuration of the painting head 53 shown in FIG. 2, if the nozzle row 55 is inclined by an angle α relative to the main scanning direction, the longitudinal direction of the painting head 53 may be inclined by an angle α relative to the main scanning direction of the painting head 53. When tilting in this way, the painting head 53 shown in FIG. 2 can be achieved by simply adjusting the paint ejection timing from each nozzles 54.

(1-5. About Paint Supply Mechanisms)

Next, the paint supply mechanism 70 and the air bubble removal member and flow meter provided in the paint supply mechanism 70 will be described.

Figure 7:
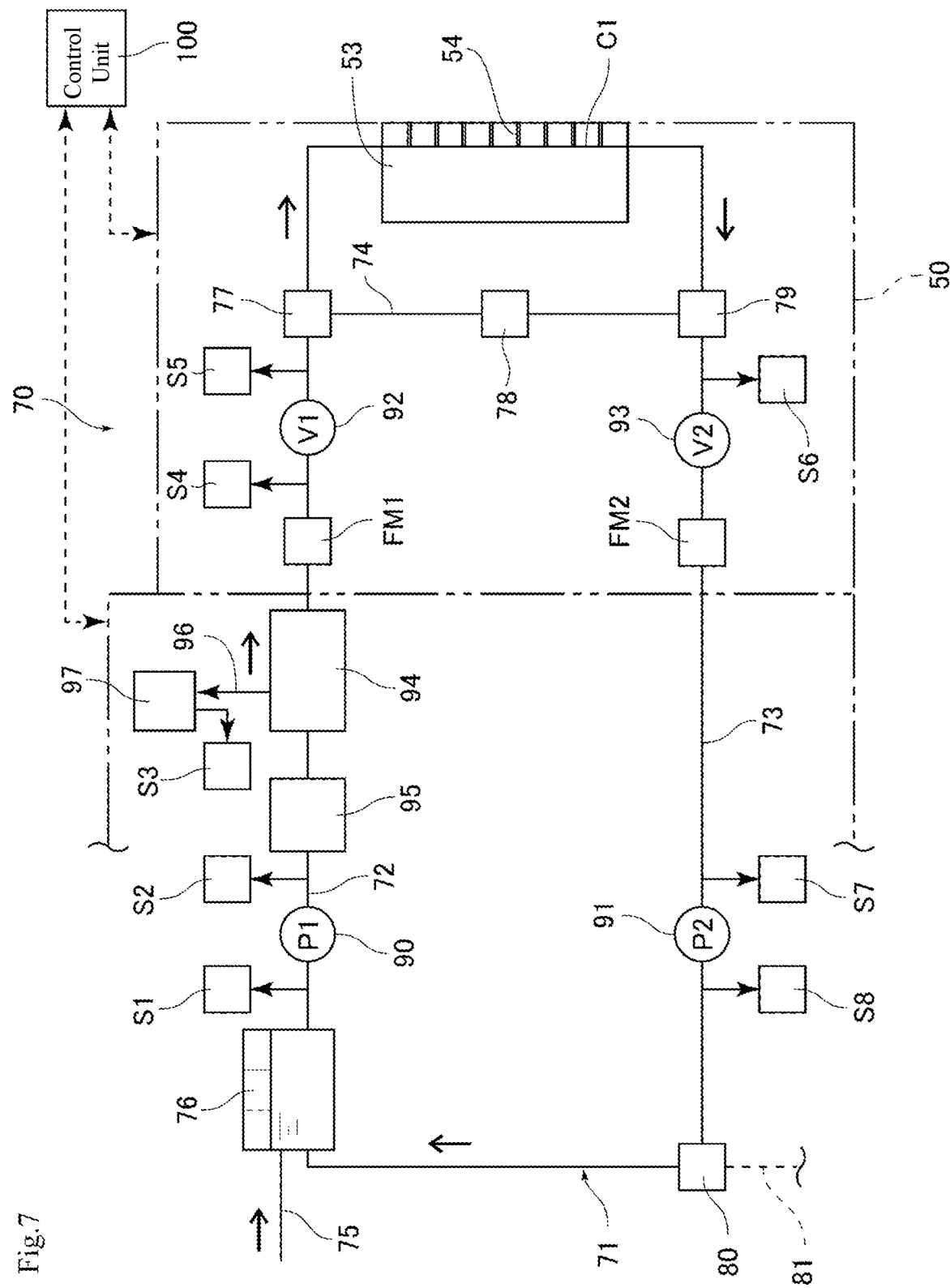
FIG. 7 A diagram showing a schematic configuration of a paint supply mechanism, etc. provided by a painting robot shown in FIG. 1.

FIG. 7 is a diagram illustrating a schematic configuration, such as a paint supply mechanism 70. The paint supply mechanism 70 consists of a paint circulation channel 71, an external supply channel 75, an air bubble removal member 76, a supply pump 90, a suction pump 91, a first paint regulator 92, a second paint regulator 93, a degassing module 94, a removal filter 95, a pressure sensor S1-S8, a first flow meter FM1, and a second flow meter FM2 as the main components.

Paint circulation channel 71 is a channel for circulating paint and includes a paint supply channel 72, a return channel 73, and a bypass channel 74. Paint supply channel 72 is a channel for supplying paint supplied from external supply channel 75 or returned from return channel 73 towards painting head 53 and is connected to supply side channel 57 described above.

Return channel 73 is a channel for returning paint that is connected to discharge side major channel 61 of painting head 53 and not dispensed at painting head 53 back to air bubble removal member 76.

The bypass channel 74 is a channel connecting the paint supply channel 72 and the return channel 73. That is, if the bypass channel 74 is provided in parallel with the painting head 53 and paint is not dispensed from the painting head 53, the paint is flowed to this bypass channel 74 by switching the operation of the three-way valve 77 described below.

The external supply channel 75 is a conduit for supplying the paint from a storage site side of a paint, such as a circular tank, to an interior of the tank body of the air bubble removal member 76.

The air bubble removal member 76 is a member for removing air bubbles contained in the paint. This air bubble removal member 76 is provided at a stable site where the pose outside of the robot arm R1 does not change. The air bubble removal member 76 is also able to supply paint to the paint supply channel 72 and is connected to the return channel 73 so as to supply paint from the return channel 73. The air bubble removal member 76 comprises an externally sealable tank body, which is provided with an outlet for exhausting gas from air bubbles accumulated therein.

The paint supply channel 72 is also connected to the three-way valve 77 downstream of the first paint regulator 92 described below. This three-way valve 77 is connected to the middle of the paint supply channel 72 and also to the bypass channel 74. Thus, when painting, the upstream and downstream sides are opened more than the three-way valve 77 of the paint supply channel 72 to supply paint to the painting head 53. On the other hand, if no paint is applied, the paint flows from the paint supply channel 72 to the bypass channel 74, but is switched so that no paint is supplied to the downstream side of the paint supply channel 72 (painting head 53 side).

Also, in the mid-section of the bypass channel 74 described above, an open/close valve 78 is provided. Actuating the opening and closing valve 78 allows paint to flow through the bypass channel 74.

In addition, a three-way valve 79 is connected to the downstream side of the bypass channel 74 rather than the open/close valve 78, and this three-way valve 79 is further connected to the upstream side of the return channel 73 (i.e., the painting head 53 side of the return channel 73) and the downstream side (i.e., the suction pump 91 side described later in the return channel 73). Thus, when painting is performed, the upstream and downstream sides are opened more than the three-way valve 79 of the return channel 73, and paint not dispensed from the painting head 53 flows downstream of the return channel 73. On the other hand, in the absence of painting, the three-way valve 79 is switched such that paint flowing through the bypass channel 74 flows through the downstream side of the return channel 73 (suction pump 91 side).

Also, of the return channel 73, a switching valve 80 is disposed downstream of the supply pump 90 described below. The switching valve 80 is also a three-way valve and is connected to the discharge channel 81 other than the upstream and downstream sides of the return channel 73. This switching valve 80 is in the normal state, with paint flowing upstream and downstream of the return channel 73. However, if, for example, the flushing liquid flows from the paint supply channel 72 to the return channel 73 via the painting head 53 or the bypass channel 74, the actuation of the switching valve 80 is switched, and the flushing liquid (waste liquid) described above is discharged through the discharge channel 81.

The return channel 73 is connected to the air bubble removal member 76 described above at a downstream side of the switching valve 80.

In addition, a supply pump 90 is connected to the middle of the paint supply channel 72. The supply pump 90 corresponds to the paint transfer means and the paint supply means. The supply pump 90 is a means for applying positive pressure to a paint flowing through the paint supply channel 72 towards a downstream side of the supply pump 90. As the supply pump 90, it is preferable to use a gear pump that can control the supply amount of paint by controlling the rotational speed. However, the supply pump 90 may use a pump other than the gear pump. This supply pump 90 is controlled by operation at the control unit 100 described below. Thereby, operation of the supply pump 90 is controllable to be a predetermined pressure set point.

In addition, a suction pump 91 is connected to the middle of the return channel 73. The suction pump 91 corresponds to paint transfer means and paint recovery means. The suction pump 91 is a means of applying a negative pressure to a paint flowing through the return channel 73 upstream of the supply pump 90. As for the suction pump 91, it is preferable to use a gear pump that can control the supply amount of paint by controlling the rotational speed, similar to the supply pump 90 described above. However, the suction pump 91 may use a pump other than the gear pump. This suction pump 91 is also controlled by operation at the control unit 100 described below. Thereby, operation of the suction pump 91 is controllable such that its downstream side is a predetermined pressure set point.

Also, at the paint supply channel 72, a first paint regulator 92 is disposed downstream of the supply pump 90. The first paint regulator 92 relieves pulsation at the supply pump 90 to supply paint at a constant pressure. The first paint regulator 92 corresponds to a regulating valve and a first regulating valve. This first paint regulator 92 is controlled at the control unit 100 described below to allow the openness to be adjusted according to the control air pressure and electrical signal. This allows the pressure downstream of the first paint regulator 92 to be controlled to be a predetermined pressure set point in response to the pressure upstream of the first paint regulator 92.

Also, in the return channel 73, a second paint regulator 93 is disposed upstream of the suction pump 91. The second paint regulator 93 relieves pulsation at the suction pump 91 and draws paint at a constant pressure (negative pressure). Note that the second paint regulator 93 corresponds to a regulating valve and a second regulating valve. This second paint regulator 93 is also adjustable according to the control air pressure and electrical signal by controlling at the control unit 100 described below. This allows the pressure upstream of the second paint regulator 93 to be controlled to be a predetermined pressure set point in response to the pressure downstream of the second paint regulator 93.

Also, at the paint supply channel 72, a degassing module 94 is disposed downstream of the supply pump 90 and upstream of the first paint regulator 92. The degassing module 94 is disposed downstream of the paint supply channel 72 rather than the removal filter 95 described below, and is a member for removing (degassing) dissolved gases that are dissolved in the paint.

Also, in the paint supply channel 72, a removal filter 95 is disposed upstream of the degassing module 94 and downstream of the supply pump 90. The removal filter 95 removes foreign matter contained in the paint flowing through the paint supply channel 72. The removal filter 95 ensures that the painting head 53 continues to operate normally, for example by removing gross foreign matter and pigment aggregates from paints containing pigments.

Next, pressure sensors S1-S8 and flow meters FM1, FM2 are described. In the paint supply channel 72, a pressure sensor S1 is disposed upstream of the supply pump 90. In addition, in the paint supply channel 72, a pressure sensor S2 is disposed downstream from the supply pump 90 and upstream from the removal filter 95. The pressure sensor S1 measures the supply pressure of paint to the supply pump 90 and sends the measurement results to the control unit 100. In addition, the pressure sensor S2 measures the pressure of the paint dispensed from the supply pump 90, and sends the measurement results to the control unit 100.

In this way, pressure sensors S1, S2 allow the estimated pressure of the supply pump 90 to be measured accurately by measuring the pressure of the paint upstream and downstream of the supply pump 90. It should be noted that the estimated pressure of the supply pump 90 may be the average value of the pressure value of the pressure sensor S1 and the pressure value of the pressure sensor S2, or may be the pressure value of either. The above estimated pressures are also used to calculate the hydrohead pressure and hydrohead pressure differentials described below.

The degassing module 94 described above is also connected to the vacuum pump 97 via the suction conduit 96. The vacuum pump 97 is an apparatus for depressurizing the interior of the housing of the degassing module 94 (the interior of the hollow fiber membrane), as described above. This decompression removes (degassing) dissolved gases that are dissolved in the paint supplied to the housing.

The pressure sensor S3 also measures the pressure of the suction conduit 96 between the vacuum pump 97 and the degassing module 94 described above.

In the paint supply channel 72, a first flow meter FM1 is disposed downstream of the degassing module 94 and upstream of the first paint regulator 92. The first flow meter FM1 measures the flow rate of the paint fed to the first paint regulator 92 and transmits the measurement results to the control unit 100. Because this first flow meter FM1 is a contactless flow meter without moving parts, such as ultrasonic, optical, electromagnetic, thermal, etc., the first flow meter FM1 is installed outside the paint supply channel 72. Note that the first flow meter FM1 may use a flow meter that exists in the movable portion.

Here, when the first flow meter FM1 is of an optical type, at least a portion of the paint supply channel 72 where the flow rate is measured by the first flow meter FM1 is provided transparently. However, if the first flow meter FM1 is an ultrasonic method other than optical, the portion of the paint supply channel 72 measuring the flow rate at least at the first flow meter FM1 need not be provided transparent.

Also, in the paint supply channel 72, a pressure sensor S4 is disposed downstream of the first flow meter FM1 and upstream of the first paint regulator 92. Also, in the paint supply channel 72, a pressure sensor S5 is disposed downstream of the first paint regulator 92 and upstream of the three-way valve 77. The pressure sensor S4 measures the supply pressure of the paint to the first paint regulator 92 and sends the measurement results to the control unit 100. In addition, the pressure sensor S5 measures the pressure of the paint dispensed from the first paint regulator 92 and transmits the measurement results to the control unit 100.

In this way, pressure sensors S4, S5 allow the estimated pressure of the first paint regulator 92 to be measured accurately by measuring the pressure of the paint upstream and downstream of the first paint regulator 92. The estimated pressure of the first paint regulator 92 may be the average value of the pressure value of the pressure sensor S4 and the pressure value of the pressure sensor S5, or may be the pressure value of either.

Although it is preferable that the above pressure sensor S4 is provided in the paint supply mechanism 70, a configuration that omits this pressure sensor S4 may be employed. In addition, the pressure sensor S4 may be provided on the painting head unit 50 side, but it may be provided on the second rotating arm 25 side (robot arm R1 side). The pressure sensor S4 may also be provided upstream of the first flow meter FM1.

Also, in the return channel 73, a pressure sensor S6 is disposed downstream of the three-way valve 79 and upstream of the second paint regulator 93. Also, in the return channel 73, a pressure sensor S7 is disposed further downstream of the flow meter FM2 (described below) downstream of the second paint regulator 93. The pressure sensor S6 measures the supply pressure of paint to the second paint regulator 93 and sends the measurement results to the control unit 100. The pressure sensor S7 also measures the pressure of the paint dispensed from the second paint regulator 93 (i.e., the pressure of the paint supplied to the suction pump 91) and sends the measurement results to the control unit 100.

In this way, pressure sensors S6, S7 allow the estimated pressure of the second paint regulator 93 to be measured accurately by measuring the pressure of the paint upstream and downstream of the second paint regulator 93. The estimated pressure of the second paint regulator 93 may be the average value of the pressure value of the pressure sensor S6 and the pressure value of the pressure sensor S7, or may be the pressure value of either one.

It should be noted that in return channel 73, the pressure sensor may be positioned downstream of second paint regulator 93 and upstream of flow meter FM2.

Also, in return channel 73, a second flow meter FM2 is disposed downstream of second paint regulator 93. The second flow meter FM2 measures the flow rate of the paint fed to the suction pump 91 and transmits the measurement results to the control unit 100. This second flow meter FM2, like the first flow meter FM1 described above, is also a contactless flow meter without any moving parts, such as ultrasonic, optical, electromagnetic, thermal, etc., so the description of that detail is omitted. It should be noted that the second flow meter FM2 may also use a flow meter that exists in the movable portion.

Also, in the return channel 73, a pressure sensor S8 is disposed downstream of the suction pump 91 and upstream of the switching valve 80 described above. The pressure sensor S8 measures the pressure of the paint delivered from the suction pump 91 and sends the measurement results to the control unit 100.

In this way, pressure sensors S7, S8 enable accurate measurement of the estimated pressure of the suction pump 91 by measuring the pressure of the paint upstream and downstream of the suction pump 91. The estimated pressure of the suction pump 91 may be the average value of the pressure value of the pressure sensor S7 and the pressure value of the pressure sensor S8, or may be the pressure value of either.

(1-8. About the General Configuration of the Control Unit)

Figure 8:
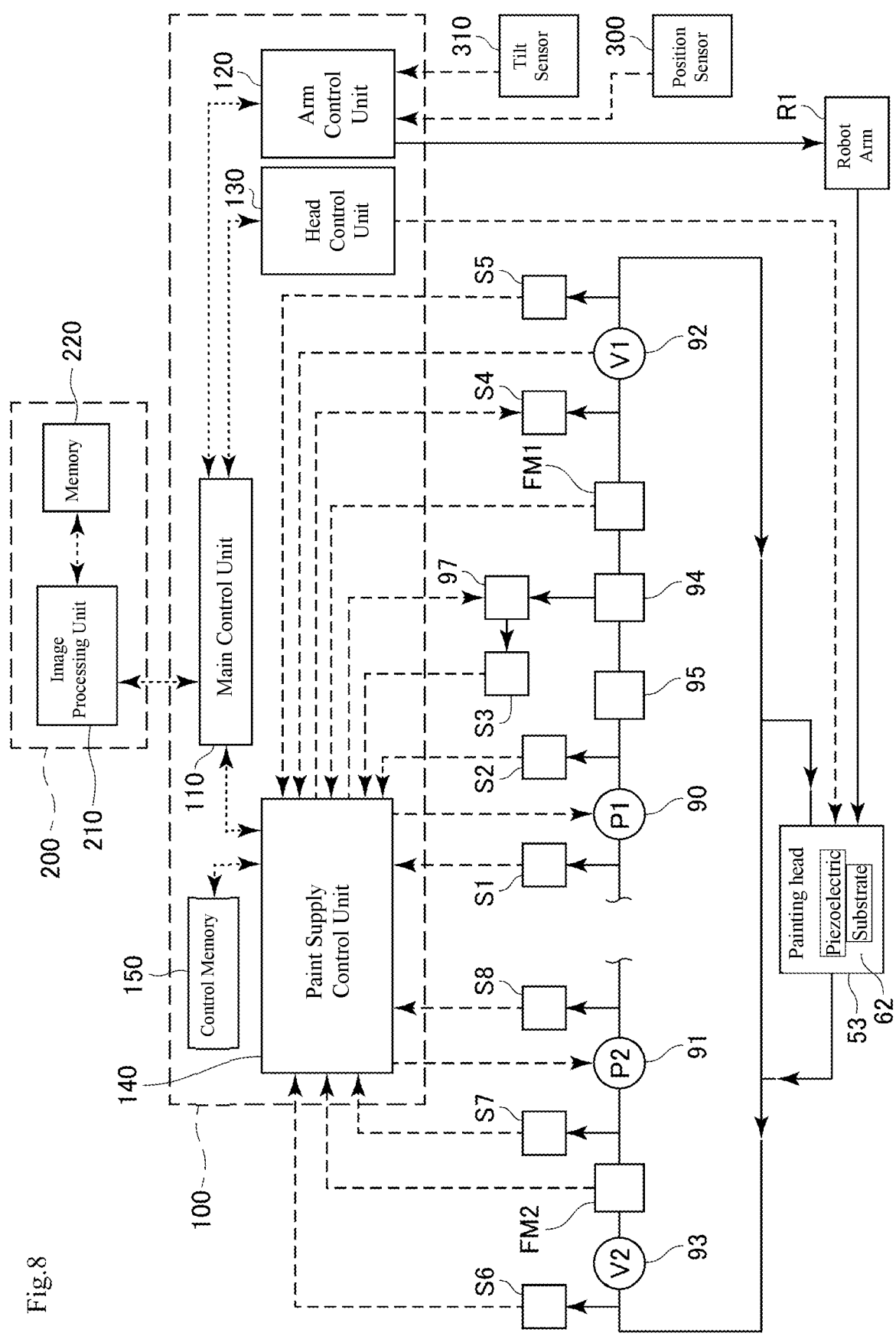
FIG. 8 A diagram showing a controlled schematic configuration centered on the control unit of the painting robot shown in FIG. 1.

Next, a schematic configuration of a control unit 100 for controlling actuation of the painting robot 10 will be described. FIG. 8 is a diagram illustrating a controlled schematic configuration about a control unit 100 of the painting robot 10. As shown in FIG. 8, the control unit 100 is made up of the main control unit 110, the arm control unit 120, the head control unit 130, the paint supply control unit 140, the control memory 150, the position sensor 300, and the tilt sensor 310 as the main components. Further, the painting robot 10 is connected to the image processing device 200 to configure a painting robot system (reference numerals omitted).

The main control unit 110, the arm control unit 120, the head control unit 130, the paint supply control unit 140, and the image processing unit 210 described below are composed of a CPU (Central Processing Unit), a storage site (Read Only Memory (ROM), Random Access Memory (RAM), non-volatile memory, etc.), and other elements. The image processing unit 210 may use a GPU (Graphics Processing Unit) together with a CPU having excellent image processing performance or at a predetermined position on the CPU.

Of the above-described control configuration, the main control unit 110 is a portion that transmits a predetermined control signal to the above-described arm control unit 120, head control unit 130, and paint supply control unit 140 such that each motor (first to sixth motor) of the robot arm R1, each actuation unit of the paint supply mechanism 70, and the piezoelectric substrate 62 cooperate to perform painting on the object.

The arm control unit 120 is also a portion that controls the drive of each motor (first to sixth motor) of the robot arm R1 described above. The arm control unit 120 is provided with an arm memory (not shown), and the arm memory stores information relating to the trajectory of the painting head 53, which is created by robot teaching in consideration of the coating width of the painting head 53 that can be coated. Data (trajectory data) and posture data relating to the posture such as inclination of the painting head 53 are stored.

Then, the arm control unit 120 controls each motor (first to sixth motors) of the robot arm R1 described above based on the trajectory data and posture data stored in the arm memory and image processing in the image processing unit 210, which will be described later. With that control, the painting head 53 can pass through the desired position for performing painting at a desired speed or stop at a predetermined position. The arm memory may be provided by the painting robot 10, but there is an arm memory (e.g., the memory 220 shown in FIG. 8) external to the painting robot 10, and it may be possible to send and receive information to the arm memory via wired or wireless communication means.

The head control unit 130 is also a portion that controls operation of the piezoelectric substrate 62 within the painting head unit 50 based on image processing at the image processing device 200. This head control unit 130 controls paint ejection based on split paint data corresponding to a position when it reaches a predetermined position in the trajectory data by means of a means to detect a position of the position sensor 300, the tilt sensor 310, etc. described below. In this case, the drive frequency of the piezoelectric substrate 62 is controlled to control the number of dots (number of droplets) ejected from the nozzles 54, or the voltage applied to the piezoelectric substrate 62 to control the size of droplets ejected from the nozzles 54, so that the film thickness of the vehicle is uniform.

The paint supply control unit 140 is also a part that controls the supply of paint to the painting head 53, and specifically controls the operation of each actuation site in the paint supply mechanism 70, such as the supply pump 90, suction pump 91, first paint regulator 92, second paint regulator 93, vacuum pump 97, three-way valves 77, 79, open/close valves 78, switching valves 80, and the like. At this time, the paint supply control unit 140 preferably controls the actuation of the actuation site, such as the above-described pump and valve, so that paint is supplied to the painting head 53 at a constant pressure. However, the paint supply control 140 may be able to control actuation of an actuation site, such as a pump or valve described above, such that paint is supplied to the painting head 53 at a constant flow rate.

Here, the paint supply control unit 140 is accessible to the control memory 150, and by such access, it is possible to read the pressure set point stored in the control memory 150, which will be described later.

The position sensor 300 is also a sensor that detects the current position of the painting head 53. As such position sensors 300, rotary encoders, resolvers, laser sensors, and various other sensors can be used. In addition, the tilt sensor 310 is a sensor that detects an angle of inclination of the painting head 53, and corresponds to an angle detection means. Such tilt sensors 310 can include, for example, gyro sensors, acceleration sensors, tilt sensors, and various other sensors.

Figure 9:
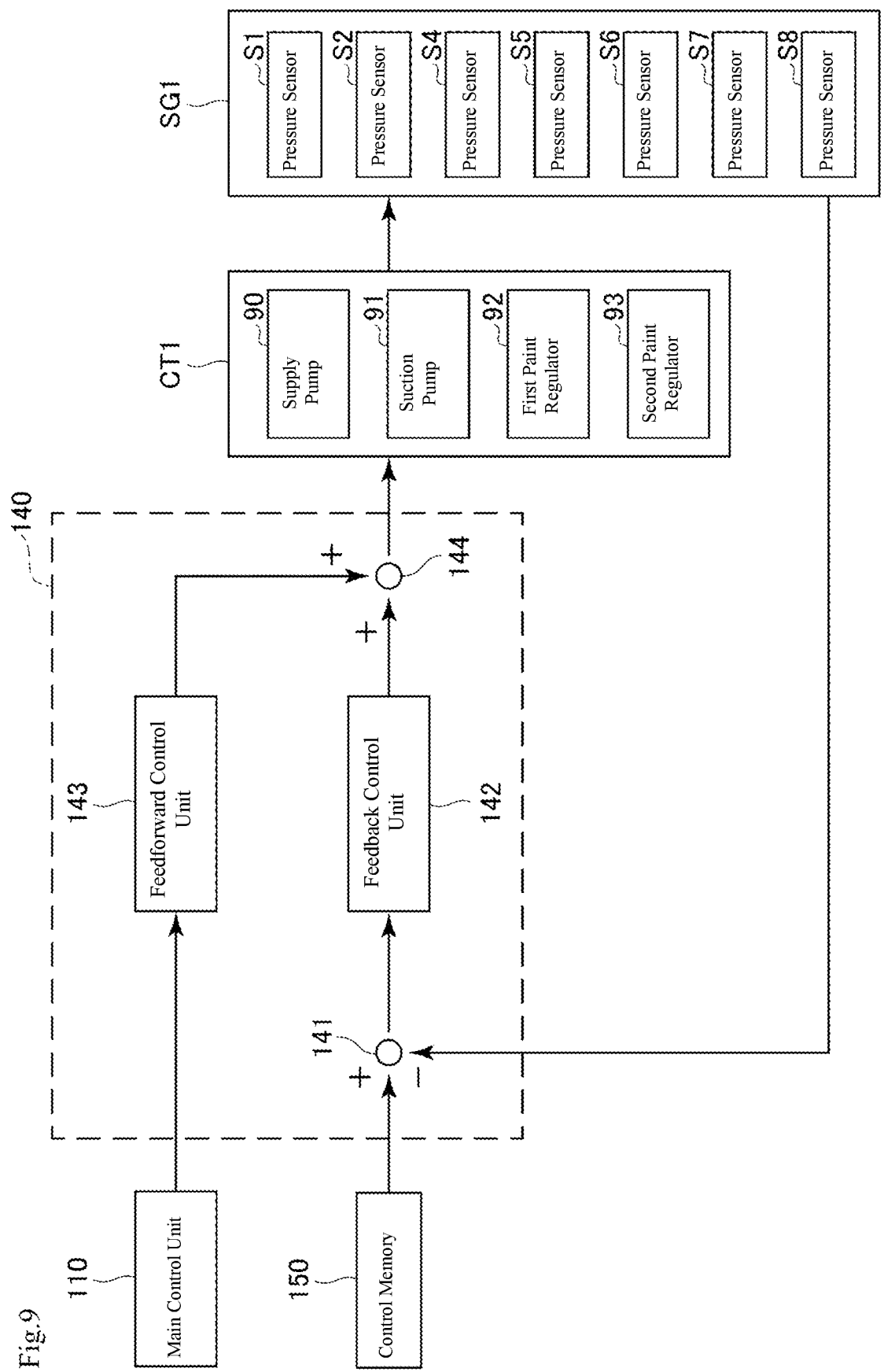
FIG. 9 A diagram showing a schematic configuration of the paint supply control unit in the painting robot shown in FIG. 1.

Next, details of the paint supply control unit 140 will be described. FIG. 9 is a diagram showing a schematic configuration of the paint supply control unit 140. As shown in FIG. 9, paint supply control unit 140 includes an adding machine 141, a feedback control unit 142, a feedforward control unit 143, and an adding machine 144. In FIG. 9, the supply pump 90, suction pump 91, first paint regulator 92, and second paint regulator 93, which are controlled targets, are set as control targets CT1. In addition, pressure sensors S1, S2, and S4 to S8 are designated as sensor groups SG1.

Of these, the adding machine 141 is the portion that calculates the difference based on the pressure set point read from the control memory 150 and the measured pressure from the sensor group SG1. In this adding machine 141, if the measured pressure from the sensor group SG1 is equal to the pressure set point above, the difference is zero.

Further, the feedback control unit 142 is a part that calculates a pressure calculation value for performing feedback control of the control target CT1 so as to obtain the pressure set point read from the control memory 150. (That is, so that the difference in the adding machine 141 becomes zero and follows the pressure set point) The feedback control unit 142 is a part that performs feedback control individually based on the pressure set point set for each control target CT1. In this feedback control unit 142, for example, by performing PID control, each control target CT1 can follow well so as to eliminate the difference (deviation) with respect to the pressure set point.

For example, when the feedback control unit 142 performs PID control, a good control is possible by setting the predetermined proportional gain Kp, the predetermined differential gain Kd, and the predetermined integral gain Ki to the appropriate values. In particular, the differential gain Kd is effective in suppressing overshoot and downshoot, so it is preferable to set it to an appropriate values.

Further, the feedforward control unit 143 is a part that performs feedforward control of the control target CT1 based on the trigger signal transmitted from the main control unit 110. This is the part where the pressure calculation is performed with the compensating pressure value in the direction opposite to the expected pressure fluctuation with respect to the above pressure set point. This feedforward control unit 143 transmits signals related to the compensating pressure values described above to the adding machine 144. In addition, the trigger signals described above are described below. The trigger signal may also be sent from a portion other than the main control unit 110 (e.g., arm control unit 120, head control unit 130, etc.).

The adding machine 144 also adds a signal for feedback control from the feedback control unit 142 and a signal for feedforward control from the feedforward control unit 143 (feedforward compensation) and sends it to the control target CT1.

<Regarding Pressure Control>

Figure 10:
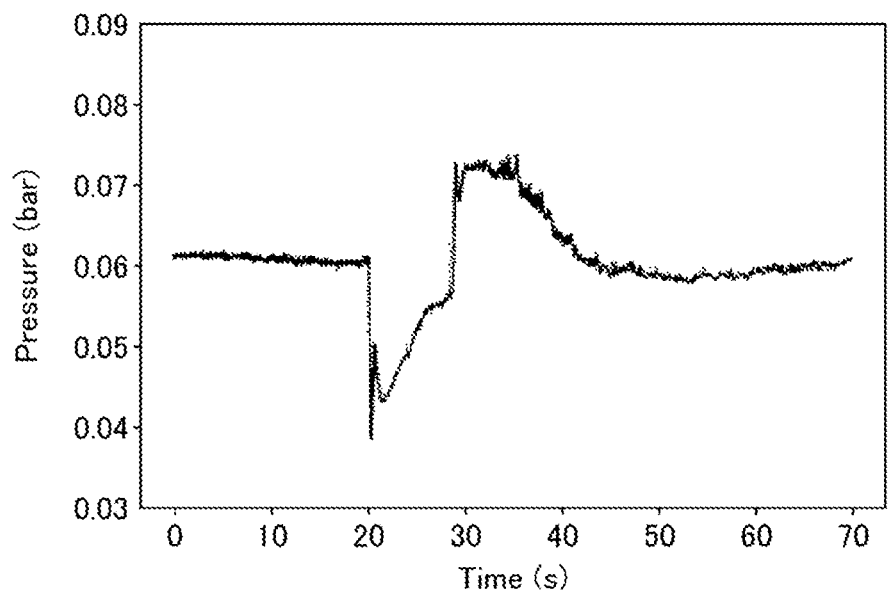
FIG. 10 A graph showing an example of the verification results of pressure change when paint is discharged from the painting head by performing control with feedback control alone without feedforward control for the control object in the painting robot shown in FIG. 1.

The pressure control at paint supply control 140 is described below. FIG. 10 is a graph showing an example of a verification result of a pressure change when performing control without feedforward control and only feedback control for the control target CT1 to dispense paint from the painting head 53 (nozzles 54). Note that FIG. 10 shows a state in which the piezoelectric substrate 62 is driven at a predetermined frequency, with the vertical axis representing pressure (bar) and the horizontal axis representing time(s). The pressure value shown in FIG. 10 is the pressure value measured by the pressure sensor S6.

As can be seen from FIG. 10, immediately after starting paint discharge from painting head 53, a downshoot occurs, causing a significant drop in pressure in nozzles 54. Here, for example, the downshoot amount is about 2 kPa compared to a state in which the pressure prior to discharge is stable (without discharge, paint is stably circulating through the paint circulation channel 71 via the bypass channel 74).

On the other hand, immediately after stopping the paint discharge from the painting head 53, an overshoot occurs, and the pressure is significantly increased compared to the state where the pressure before discharge is stable. Here, for example, the overshoot amount is approximately 1.5 kPa compared to the state in which the pressure before ejection is stable.

Figure 11:
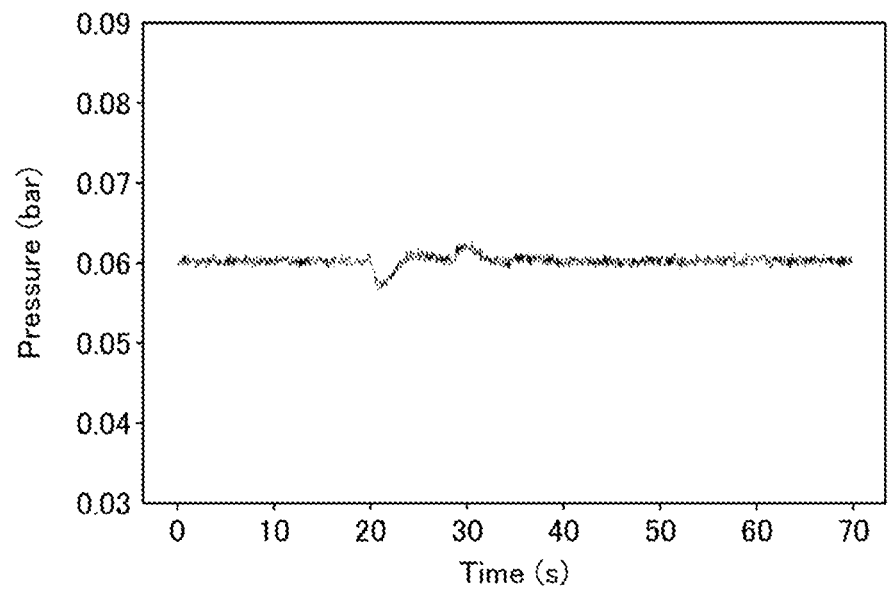
FIG. 11 A graph showing an example of the verification results of pressure change when performing feedback control and dispensing paint from the painting head with feedforward control for the control object in the painting robot shown in FIG. 1.

For the case where only feedback control is performed like this, FIG. 11 shows an example that the feedforward control unit 143 is provided to feedforward control performed by this feedforward control unit 143. FIG. 11 is a graph showing an example of a verification result of a pressure change when paint is discharged from the painting head 53 (nozzles 54) by performing feedforward control and feedback control on the control target CT1. FIG. 11 shows a graph in a state in which the piezoelectric substrate 62 is driven at a predetermined frequency as in FIG. 10, with the vertical axis representing pressure (bar) and the horizontal axis representing time(s). The pressure value in FIG. 11 is also the pressure value measured by the pressure sensor S6, similar to FIG. 10.

In addition, the verification results shown in FIG. 11 aim to inhibit both the downshoot amount and the overshoot amount. Therefore, in order to suppress the downshoot amount, the compensating pressure value is calculated at the feedforward control unit 143 based on the trigger signal at the start of discharge (related to the start of discharge) from the paint discharge stop state from the painting head 53, and the control target CT1 is controlled by adding the compensation pressure value and the pressure calculation value from the feedforward control unit 143 by the adding machine 144. Therefore, in order to suppress the overshoot amount, the compensating pressure value is calculated at the feedforward control unit 143 based on the trigger signal at the stoppage of discharge (related to the stoppage of discharge) from the paint discharge state of paint from the painting head 53, and the control target CT1 is controlled by adding the compensation pressure value and the pressure calculation value from the feedforward control unit 143 by the adding machine 144.

That is, in order to suppress both the downshoot amount and the overshoot amount, feedback control and feedforward control are performed in combination, and so does the control of the control target CT1. However, in FIG. 11, a combined control of feedback control and feedforward control may also be performed based on the trigger signal at the start of paint dispensing from painting head 53 to try to suppress downshoot amount only. The combined control of feedback control and feedforward control may also be performed based on the trigger signal at the stoppage of paint dispensing from painting head 53 to try to suppress overshoot amount only.

In FIG. 11, for example, the downshoot amount is effectively suppressed to about 1 kPa or less compared to a state where the pressure before discharge is stable (the state in which the paint is stably circulated through the paint circulation channel 71 via the bypass channel 74 without being discharged). That is, in addition to the feedback control unit 142, a feedforward control unit 143 is provided, and by combining feedback control and feedforward control to control the control target CT1, the downshoot amount is dramatically reduced compared to the case shown in FIG. 10. Also, in FIG. 11, for example, the overshoot amount is effectively suppressed to about 1 kPa or less compared to a state where the pressure before discharge is stable (the state in which the paint is stably circulated through the paint circulation channel 71 via the bypass channel 74 without being discharged). That is, in addition to the feedback control unit 142, a feedforward control unit 143 is provided, and by combining feedback control and feedforward control to control the control target CT1, the overshoot amount is dramatically reduced compared to the case shown in FIG. 10.

Based on the verification results shown in FIG. 10 and FIG. 11 as described above, the combination of feedback control and feedforward control to control the control target CT1 allows the suppression of the amount of downshoot and/or overshoot.

In addition, in FIG. 11, it is possible to better suppress the downshoot amount and/or overshoot amount by adjusting each gain when controlling each control target CT1 at the feedback control unit 142 and feedforward control unit 143.

Figure 12:
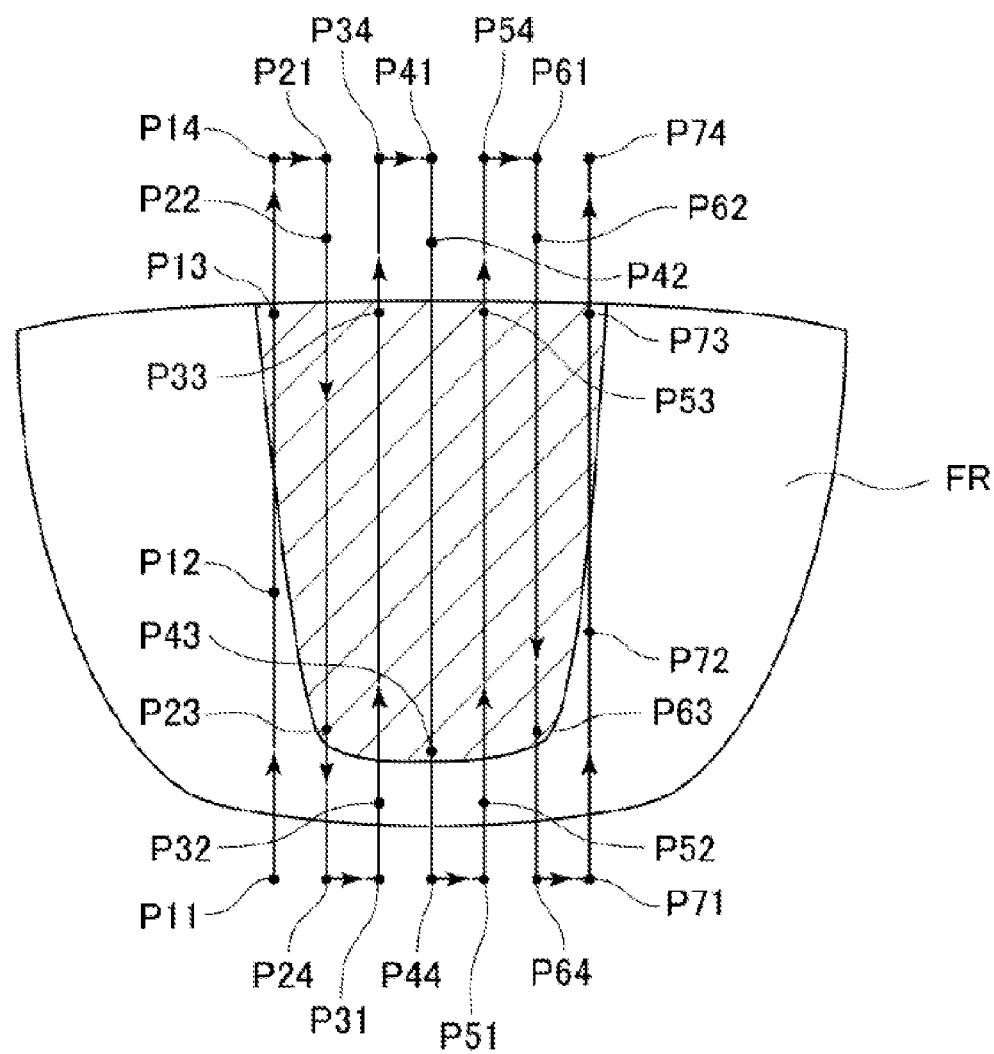
FIG. 12 A diagram showing an image of a painting robot shown in FIG. 1 in which the trigger signal is used to reach a predetermined position on the movement path of the painting head.

Here, the trigger signal sent from the main control unit 110 to the feedforward control unit 143 includes, for example, a signal regarding the start of discharge from the painting head 53 when trying to suppress the downshoot amount and/or the overshoot amount. However, the trigger signal is not limited thereto. For example, the trigger signal may be a predetermined position on the moving path of the painting head 53 when the robot arm R1 is operated based on robot teaching. FIG. 12 is a diagram showing an image when reaching a predetermined position on the moving path of the painting head 53 is used as a trigger signal.

In FIG. 12, for example, when position information is detected by the position sensor 300, spatial position coordinates of painting head 53 can be determined from the trajectory of painting head 53 based on the robot teaching. Therefore, the positional information of the position sensor 300 corresponding to the arrival of the painting head 53 at a predetermined spatial position coordinate may be used as the trigger signal. For example, when the painting head 53 starts discharging paint after a predetermined timing after the painting head 53 reaches the predetermined spatial position coordinate, the arrival at a predetermined spatial position coordinate may be used as a trigger signal for starting discharge. Further, even when the painting head 53 stops discharging paint after a predetermined timing after the painting head 53 reaches the predetermined spatial position coordinates, the arrival at the spatially predetermined position coordinates may be used as a trigger signal for stopping discharge.

Note that FIG. 12 shows the position of the trigger signal in each painting path when the hatched portion of the vehicle FR is painted. In the painting path in which the painting head 53 starts moving from position P11 toward position P14, an attempt is made to suppress the downshoot using the position information of the position sensor 300 when reaching the position P12 as a trigger signal, and an attempt is made to suppress overshoot using the position information of the position sensor 300 when reaching the position P13 immediately before the painting is finished as a trigger signal.

Then, in the painting path in which the painting head 53 starts moving from the position P14 to the position P21 and then starts moving from the position P21 toward the position P14, an attempt is made to suppress the downshoot using the position information of the position sensor 300 when reaching the position P22 as a trigger signal, and an attempt is made to suppress overshoot using the position information of the position sensor 300 when reaching the position P23 immediately before the painting is finished as a trigger signal.

Similarly, in a painting path in which each of the painting heads 53 moves from position P24, position P34, position P44, position P54, and position P64 to position P21, position P31, position P41, position P51, position P61 and position P71, respectively; and then starts moving from position P31, position P41, position P51, position P61 and position P71 toward position P34, position P44, position P54, position P64 and position P74, respectively, an attempt is made to suppress downshoot, using the positional information of the position sensor 300 when reaching the position P32, position P42, position P52, position P62 and position P72 as a trigger signal, and an attempt is also made to suppress overshoot using the position information of the position sensor 300 when reaching the position P33, position P43, position P53, position P63 and position P73 immediately before the painting is finished as a trigger signal.

It should be noted that in actual painting, even if overshoot occurs when the discharge of paint droplets from the painting head 53 is stopped, since the droplets of the paint are not discharged for a predetermined period of time after that, it is effective to suppress the downshoot. Therefore, in FIG. 12, it is not necessary to suppress the overshoot by using, as the trigger signal, the position information of the position sensor 300 when the position P13, position P23, position P33, position P43, position P53, position P63 and position P73 is reached.

Also, as shown in FIG. 13, a change of the attitude of the robot arm R1 such that it is inclined by an angle θ1, and a sudden change in the height difference of the supply pump 90, suction pump 91, first paint regulator 92, and second paint regulator 93 will cause the occurrence of downshoots and overshoots as described above. So, for example, based on the robot teaching, if it is possible to predict that the attitude of the robot arm R1 will change after a predetermined timing from the position information of the position sensor 300 corresponding to the arrival of the painting head 53 at the predetermined spatial position coordinate, detection of reaching a predetermined position by the position sensor 300 may be used as the trigger signal. Also, for example, based on the robot teaching, if it is possible to predict that the tilt angle information from the tilt sensor 310 of the posture of the robot arm R1 will change after a predetermined timing, detection of reaching a predetermined tilt angle by the tilt sensor 310 may be used as a trigger signal.

Although FIG. 13 shows that the painting head 53 is tilted due to the change of posture of the robot arm R1, it is possible to set the trigger signal as described above even if the change of posture of the robot arm R1 occurs even though the painting head 53 is not tilted.

(2. About the Effect)

As described above, the painting robot 10 for painting a vehicle FR is provided with a plurality of nozzles 54 for discharging droplets of paint; a painting head unit 50 comprising a painting head 53 comprising a piezoelectric substrate 62 for driving droplets out of nozzles 54; a robot arm R1 that mounts the painting head unit 50 on its tip and moves the painting head unit 50 to a desired position; a paint supply mechanism 70 provided between the robot arm R1 and the painting head unit 50; a control unit 100 that controls the driving of the robot arm R1 and the paint supply mechanism 70.

And the paint supply mechanism 70 comprises a paint circulation channel 71 provided between the robot arm R1 and the painting head unit 50 for supplying paint to the painting head 53 and collecting paint not discharged from the painting head 53; a supply pump 90 and/or a suction pump 91 (paint transfer means) provided in the middle of the paint circulation channel 71 for supplying and collecting the paint between the paint storage portion and the painting head 53; and a first paint regulator 92 and/or a second paint regulator 93 (regulating valve) provided in the middle of the paint circulation channel 71 and capable of adjusting opening and closing of the internal flow path of the paint circulation channel 71; and the control unit 100 comprises a control memory 150 in which pressure set points are stored; a feedback control unit 142 that controls the operation of at least one of the supply pump 90 and/or the suction pump 91 (paint transfer means) and the first paint regulator 92 and/or the second paint regulator 93 (regulating valve), by calculating a pressure calculation value for executing feedback control of the operation of the supply pump 90 and/or the suction pump 91 (paint transfer means), so to be the pressure setting values read from the control memory 150; and a feedforward control unit 143 that controls the operation of at least one of the supply pump 90 and/or the suction pump 91 (paint transfer means) and the first paint regulator 92 and/or the second paint regulator 93 (regulating valve), by correcting the calculated pressure value with the compensating pressure value in the opposite direction to the expected pressure fluctuation against the pressure setting value.

In this way, the control unit 100 includes a feedback control unit 142 and a feedforward control unit 143. For this reason, when at least one of the supply pump 90 and/or the suction pump 91 (paint transfer means) and the first paint regulator 92 and/or the second paint regulator 93 (regulating valve) performs a feedback control to achieve the pressure set point, if pressure fluctuations such as downshoots or overshoots are expected, the feedforward control unit 143 can suppress the pressure fluctuation by calculating a compensating pressure value in the direction opposite to the pressure fluctuation, and correcting the pressure calculation value with this compensation pressure value.

This reduces the effects of pressure fluctuations, such as downshoot and overshoot. This can stabilize the dispensing pressure, for example, when dispensing paint from the painting head 53, and can also perform paint dispensing continuously. That is, it is possible to prevent a failure such as a paint overflowing from the nozzles 54 due to a drop in pressure in the painting head 53 resulting in an unstable paint discharge state including a paint non-discharge or an increase in pressure in the painting head 53. It is thereby possible to prevent defects such as dirty nozzle forming surface 52 of painting head 53 or inability to paint the next vehicle, etc.

In the present embodiment, the paint circulation channel 71 also comprises a paint supply channel 72 for supplying paint to the painting head 53 and a return channel 73 connected to the paint discharge side of the painting head 53 for collecting paint that was not dispensed from the nozzles 54. The paint transfer means is provided with a supply pump 90 (paint supply means) that is mounted at a predetermined position on the robot arm R1, provided in the middle of the paint supply channel 72 and applies pressure for supplying paint toward the painting head 53 based on the control by the control unit 100; and a suction pump 91 (paint recovery means) that is mounted at a predetermined position on the robot arm R1 and is provided in the middle of the return channel 73, at the same time, that applies pressure to the downstream side of the return channel 73 for collecting the paint that has not been discharged from the painting head 53 based on the control of the control unit 100; and the feedforward control unit 143 can operate the supply pump 90 (paint supply means) by correcting the pressure calculation value with the compensation pressure value for correcting the supply pump 90 (paint supply means) to the side that increases the drive, based on the trigger signal related to the start of paint discharge from the discharge stop state from the painting head 53.

In this way, it is possible to reduce the effect of pressure drop at the start of paint discharge by combining feedback control and feedforward control, such as calculating the compensating pressure value by the feedforward control unit 143 and correcting the pressure calculation value with the compensating pressure value, based on the trigger signal associated with the start of paint discharge from discharge stop state from the painting head 53, for supply pump 90 (paint supply means).

Also, in the present embodiment, the feedforward control unit 143 can activate the suction pump 91 (paint recovery means) by correcting the pressure calculation value with the compensating pressure value that corrects the suction pump 91 (paint recovery means) to the drive reduction side, based on the trigger signal associated with starting the discharge of paint from the discharge stop state from the painting head 53.

In this way, it is possible to reduce the effect of pressure drop at the start of paint discharge by combining feedback control and feedforward control, such as calculating the compensating pressure value at feedforward control unit 143 and correcting the pressure calculation value with the compensating pressure value, based on the trigger signal associated with the start of paint discharge from discharge stop state from the painting head 53, for suction pump 91 (paint recovery means).

Also, in the present embodiment, the feedforward control unit 143 can actuate the supply pump 90 (paint supply means), by correcting the pressure calculation value with the compensation pressure value that corrects the supply pump 90 (paint supply means) to stop driving, based on the trigger signal associated with a stop of discharge of paint from the discharge state from the painting head 53.

In this way, it is possible to reduce the effect of pressure drop at the stop of paint discharge by combining feedback control and feedforward control, such as calculating the compensating pressure value at feedforward control unit 143 and correcting the pressure calculation value with the compensating pressure value, based on the trigger signal associated with the stop of paint discharge from the discharge state from the painting head 53, for supply pump 90 (paint supply means).

Also, in the present embodiment, the feedforward control unit 143 can activate the suction pump 91 (paint recovery means), by correcting the pressure calculation value with the compensating pressure value for correcting the suction pump 91 (paint recovery means) to the side that increases the drive, based on the trigger signal associated with stopping the discharge of paint from the discharge state from the painting head 53.

In this way, it is possible to reduce the effect of pressure drop at the stop of paint discharge by combining feedback control and feedforward control, such as calculating the compensating pressure value by the feedforward control unit 143 and correcting the pressure calculation value with the compensating pressure value, based on the trigger signal associated with the stop of paint discharge from the discharge state from the painting head 53, for suction pump 91 (paint recovery means).

Also, in this embodiment, the regulating valve comprises a first paint regulator 92 (the first regulating valve) provided on the downstream side of the paint supply channel 72 from the supply pump 90 (paint supply means) for adjusting the pressure of the paint directed to the painting head 53 based on control by the control unit 100; and a second paint regulator 93 (the second adjusting valve) provided on the upstream side of the return channel 73 from the suction pump 91 (paint recovery means), for adjusting the pressure of the paint recovered from the painting head 53 based on the control by the control unit 100. The feedforward control unit 143 can control the operation of at least one of the first paint regulator 92 (first regulating valve) and the second paint regulator 93 (second regulating valve), by compensating the pressure calculation value with the compensating pressure value, based on the trigger signal associated with the start of discharge from the discharge stop state or the stop of discharge of paint from the discharge state from the painting head 53.

in this way, it is possible to reduce the influence of the pressure drop at the start of paint discharge, by at least one of the first paint regulator 92 (first regulating valve) and the second paint regulator 93 (second regulating valve) to control that combines feedback control and feedforward control, by the feedforward control unit 143 calculating the compensation pressure value and correcting the pressure calculation value with the compensation pressure value, based on the trigger signal related to the start of paint discharge from the discharge stop state from the paint head 53 or based on the trigger signal related to the stop of paint discharge from the discharge state from the paint head 53.

Also, in the present embodiment, the feedforward control unit 143 can operate the first paint regulator 92 (first regulating valve) by correcting the pressure calculation value with the compensation pressure value that is to open the first paint regulator 92 (first regulating valve), based on the trigger signal related to the start of paint discharge from the discharge stop state from the painting head 53.

In this way, it is possible to reduce the effect of pressure drop at the start of paint discharge by combining feedback control and feedforward control, such as calculating the feedforward control unit 143 compensating pressure value and correcting the pressure calculation value with the compensating pressure value, based on the trigger signal associated with the start of paint discharge from the discharge stop state from painting head 53, for first paint regulator 92 (first regulating valve).

Also, in the present embodiment, the feedforward control unit 143 can operate the second regulating valve, by correcting the pressure calculation value with the compensation pressure value that is to close the second paint regulator 93 (second regulating valve), based on the trigger signal related to the start of paint discharge from the discharge stop state from the painting head 53.

In this way, it is possible to reduce the effect of pressure drop at the start of paint discharge by combining feedback control and feedforward control, such as the feedforward control unit 143 calculating the compensating pressure value and correcting the pressure calculation value with the compensating pressure value, based on the trigger signal associated with the start of paint discharge from the discharge stop state from painting head 53, for the second paint regulator 93 (second regulating valve).

Also, in the present embodiment, the feedforward control unit 143 can operate the first paint regulator 92 (first regulating valve) by correcting the pressure calculation value with the compensation pressure value that is to close the first paint regulator 92 (first regulating valve), based on the trigger signal related to the stop of paint discharge from the discharge state the painting head 53.

In this way, it is possible to reduce the effect of pressure increase at the stop of paint discharge by combining feedback control and feedforward control, such as the feedforward control unit 143 calculating the compensating pressure value and correcting the pressure calculation value with the compensating pressure value, based on the trigger signal associated with the stop of paint discharge from the discharge state from painting head 53, for the first paint regulator 92 (first regulating valve).

Also, in the present embodiment, the feedforward control unit 143 can operate the second paint regulator 93 (second regulating valve) by correcting the pressure calculation value with the compensation pressure value that is to open the second paint regulator 93 (second regulating valve), based on the trigger signal related to the stop of paint discharge from the discharge state from the painting head 53.

In this way, it is possible to reduce the effect of pressure increase at the stop of paint discharge by combining feedback control and feedforward control, such as the feedforward control unit 143 calculating the compensating pressure value and correcting the pressure calculation value with the compensating pressure value, based on the trigger signal associated with the stop of paint discharge from the discharge state from painting head 53, for second paint regulator 93 (second regulating valve).

Further, in this embodiment, the feedforward control unit 143 can control the actuation of at least one of the paint transfer means and the regulating valve, by correcting the pressure calculation value with the compensating pressure value in the opposite direction to the expected pressure fluctuation against the pressure calculation value, based on the trigger signal related to a change in the posture of the painting head 53.

in this way, it is possible to reduce the influence of pressure fluctuation when the posture of the painting head 53 is changed, by performing control that combines feedback control and feedforward control, such as the feedforward control unit 143 correcting the pressure calculation value with the compensation pressure value, and calculating the compensation pressure value, based on the trigger signal related to the change of posture of the painting head 53.

(3. About Variations)

Although one embodiment of the present invention has been described above, the present invention is variously deformable other than the above embodiments. Variations are described below.

In the embodiment described above, a configuration comprising pressure sensors S1-S8 and a first flow meter FM1 and a second flow meter FM2 is employed. However, if the first flow meter FM1 and the second flow meter FM2 are provided, at least one of the pressure sensors S1-S8 may be omitted, and if the pressure sensors S1-S8 are provided, at least one of the first flow meter FM1 and the second flow meter FM2 may be omitted.

EXPLANATION OF REFERENCES

10 . . . Painting robot, 11 . . . painting robot system, 20 . . . robot main body, 21 . . . base, 22a . . . first rotating axis, 22b . . . second rotating axis, 22c . . . third rotating axis, 22d . . . fourth rotating axis, 22e . . . fifth rotating axis, 22f . . . sixth rotating axis, 24 . . . first rotating arm, 25 . . . second rotating arm, 26 . . . rotating arm, 27 . . . wrist portion, 50 . . . painting head unit, 52 . . . nozzle forming surface, 53 . . . painting head, 54 . . . nozzle, 55 . . . nozzle row, 55A . . . first nozzle row, 55B . . . second nozzle row, 57 . . . supply side major channel, 58 . . . row-directed supply channel, 59 . . . nozzle pressurization chamber, 59a . . . nozzle supply channel, 59b . . . nozzle discharge channel, 60 . . . row-directed discharge channel, 61 . . . discharge side major channel, 62 . . . piezoelectric substrate, 63a . . . piezoelectric ceramic layer 63b . . . piezoelectric ceramic layer 64 . . . common electrode 65 . . . individual electrode 70 . . . paint supply mechanism 71 . . . paint circulation channel 72 . . . paint supply channel 73 . . . return channel, 74 . . . bypass channel, 75 . . . external supply channel, 76 . . . air bubble removal member, 77 . . . three-way valve, 78 . . . open/close valve, 79 . . . three-way valve, 80 . . . switching valve, 81 . . . outlet, 90 . . . supply pump (corresponding to paint supply means), 91 . . . suction pump (corresponding to paint recovery means), 92 . . . first paint regulator (corresponding to the first regulating valve), 93 . . . second paint regulator (corresponding to the second regulating valve), 94 . . . degassing module, 95 . . . removal filter, 96 . . . suction conduit, 97 . . . vacuum pump, 100 . . . control unit, 110 . . . main control unit, 120 . . . arm control unit, 130 . . . head control unit, 140 . . . paint supply control unit, 141, 144 . . . adding machine, 142 . . . feedback control unit, 143 . . . feedforward control unit, 150 . . . control memory, 200 . . . image processing device, 210 . . . image processing unit, 220 . . . memory, 300 . . . position sensor, 310 . . . tilt sensor (corresponding to angle detection means), FM1 . . . first flow meter, FM2 . . . second flow meter, FR . . . vehicle, PS . . . paint path, R1 . . . robot arm, and S1~S8 . . . pressure sensor

The invention claimed is:

1. A painting robot for painting a vehicle, comprising:
a painting head unit, wherein the painting head unit includes:
a painting head, wherein the painting head includes:
a plurality of nozzles for ejecting paint droplets;
a robot arm, wherein the robot arm includes:
a tip mounted with the painting head unit, and the robot arm is configured for moving the painting head unit to a desired position;
a paint supply mechanism disposed between the robot arm and the painting head unit; and
a control unit for controlling a drive of the robot arm and the paint supply mechanism;
wherein the paint supply mechanism comprises:
a paint circulation channel disposed between the robot arm and the painting head unit to recover paint not dispensed from the painting head unit while supplying the paint to the painting head unit;
a paint transfer means disposed in a middle portion of the paint circulation channel, for providing and recovering the paint between a reservoir site of the paint and the painting head unit; and
a regulating valve disposed midway through the paint circulation channel and being configured to be adjustable to open and close an internal flow path of the paint circulation channel; and
wherein the control unit comprises:
a control memory in which a pressure set point is stored;
a feedback control unit for controlling operation of at least one of the paint transfer means and the regulating valve, by calculating a pressure calculation value for executing feedback control of the operation of at least one of the paint transfer means and the regulating valve, so as to be the pressure set point read from the control memory; and
a feedforward control unit for controlling the operation of the at least one of the paint transfer means and the regulating valve, by correcting the calculated pressure calculation value with a compensating pressure value in an opposite direction to an expected pressure fluctuation with respect to the pressure set point, based on a trigger signal related to a change of state of the painting head unit;
wherein the paint circulation channel comprises:
a paint supply channel for providing paint to the painting head; and a return channel connected to a paint discharge side of the painting head to recover the paint not dispensed from the nozzle;

wherein the paint transfer means comprises:

a paint supply means mounted at a predetermined position on the robot arm and disposed midway through the paint supply channel and applying pressure to supply the paint to the painting head based on control at the control unit; and a paint recovery means mounted in a predetermined position of the robot arm and disposed midway through the return channel and applying pressure downstream of the return channel to recover the paint not dispensed from the painting head based on control at the control; and wherein the feedforward control unit operates the paint supply means, by correcting the calculated pressure calculation value with the compensating pressure value for correcting the paint supply means to increase the driving force, based on the trigger signal related to the start of discharge of the paint from the discharge stop state of the paint from the painting head.

2. The painting robot according to claim 1, wherein the feedforward control unit operates the paint recovery means, by correcting the calculated pressure calculation value with the compensating pressure value for correcting the paint recovery means to decrease the driving force, based on the trigger signal related to the start of discharge of the paint from the discharge stop state of the paint from the painting head.

3. The painting robot according to claim 1, wherein the feedforward control unit operates the paint supply means, by correcting the calculated pressure calculation value with the compensating pressure value for correcting the paint supply means to increase the driving force, based on the trigger signal related to the stoppage of discharge of the paint from the discharge state of the paint from the painting head.

4. The painting robot according to claim 1, wherein the feedforward control unit operates the paint recovery means, by correcting the calculated pressure calculation value with the compensating pressure value for correcting the paint recovery means to increase the driving force, based on the trigger signal related to the stoppage of discharge of the paint from the discharge state of the paint from the painting head.

5. The painting robot according to claim 1, wherein the regulating valve comprises:

a first regulating valve provided downstream of the paint supply channel rather than the paint supply means, configured to adjust a pressure of the paint towards the painting head based on control at the control unit; and a second regulating valve provided upstream of the return channel rather than the paint recovery means, configured to adjust a pressure of paint recovered from the painting head based on control at the control unit; and the feedforward control unit being configured to control operation of at least one of the first regulating valve and the second regulating valve, by correcting the calculated pressure calculation value with the compensating pressure value, based on the trigger signal related to the start of discharge from the discharge stop state of the paint from the painting head or the stop of discharge from the discharge state of the paint from the painting head.

6. The painting robot according to claim 5, wherein the feedforward control unit operates the first regulating valve, by correcting the calculated pressure calculation value with the compensating pressure value for correcting the paint recovery means on the side that opens the first regulating valve, based on the trigger signal related to the start of discharge of the paint from the discharge stop state of the paint from the painting head.

7. The painting robot according to claim 5, wherein the feedforward control unit operates the second regulating valve, by correcting the calculated pressure calculation value with the compensating pressure value for correcting the paint recovery means on the side that closes the second regulating valve, based on the trigger signal related to the start of discharge of the paint from the discharge stop state of the paint from the painting head.

8. The painting robot according to claim 5, wherein the feedforward control unit operates the first regulating valve, by correcting the calculated pressure calculation value with the compensating pressure value for correcting the paint recovery means on the side that closes the first regulating valve, based on the trigger signal related to the stoppage of discharge of the paint from the discharge state of the paint from the painting head.

9. The painting robot according to claim 5, wherein the feedforward control unit operates the second regulating valve, by correcting the calculated pressure calculation value with the compensating pressure value for correcting the paint recovery means on the side that opens the second regulating valve, based on the trigger signal related to the stoppage of discharge of the paint from the discharge state of the paint from the painting head.

10. The painting robot according to claim 1, wherein the feedforward control unit controls the operation of at least one of the paint transfer means and the regulating valve, by correcting the calculated pressure calculation value with a compensating pressure value in the opposite direction to the expected pressure fluctuation with respect to the pressure set point, based on the trigger signal related to the change of posture of the painting head.

11. The painting robot according to claim 2, wherein the feedforward control unit operates the paint supply means, by correcting the calculated pressure calculation value with the compensating pressure value for correcting the paint supply means to increase the driving force, based on the trigger signal related to the stoppage of discharge of the paint from the discharge state of the paint from the painting head.

12. The painting robot according to claim 2, wherein the feedforward control unit operates the paint recovery means, by correcting the calculated pressure calculation value with the compensating pressure value for correcting the paint recovery means to increase the driving force, based on the trigger signal related to the stoppage of discharge of the paint from the discharge state of the paint from the painting head.

13. The painting robot according to claim 3, wherein the feedforward control unit operates the paint recovery means, by correcting the calculated pressure calculation value with the compensating pressure value for correcting the paint recovery means to increase the driving force, based on the trigger signal related to the stoppage of discharge of the paint from the discharge state of the paint from the painting head.

14. The painting robot according to claim 2, wherein the regulating valve comprises:

a first regulating valve provided downstream of the paint supply channel rather than the paint supply means, configured to adjust a pressure of the paint towards the painting head based on control at the control unit; and a second regulating valve provided upstream of the return channel rather than the paint recovery means, configured to adjust a pressure of paint recovered from the painting head based on control at the control unit; and the feedforward control unit being configured to control operation of at least one of the first regulating valve and the second regulating valve, by correcting the calculated pressure calculation value with the compensating pressure value, based on the trigger signal related to the start of discharge from the discharge stop state of the paint from the painting head or the stop of discharge from the discharge state of the paint from the painting head.

15. The painting robot according to claim 3, wherein the regulating valve comprises:

a first regulating valve provided downstream of the paint supply channel rather than the paint supply means, configured to adjust a pressure of the paint towards the painting head based on control at the control unit; and a second regulating valve provided upstream of the return channel rather than the paint recovery means, configured to adjust a pressure of paint recovered from the painting head based on control at the control unit; and the feedforward control unit being configured to control operation of at least one of the first regulating valve and the second regulating valve, by correcting the calculated pressure calculation value with the compensating pressure value, based on the trigger signal related to the start of discharge from the discharge stop state of the paint from the painting head or the stop of discharge from the discharge state of the paint from the painting head.

16. The painting robot according to claim 4, wherein the regulating valve comprises:

a first regulating valve provided downstream of the paint supply channel rather than the paint supply means, configured to adjust a pressure of the paint towards the painting head based on control at the control unit; and a second regulating valve provided upstream of the return channel rather than the paint recovery means, configured to adjust a pressure of paint recovered from the painting head based on control at the control unit; and the feedforward control unit being configured to control operation of at least one of the first regulating valve and the second regulating valve, by correcting the calculated pressure calculation value with the compensating pressure value, based on the trigger signal related to the start of discharge from the discharge stop state of the paint from the painting head or the stop of discharge from the discharge state of the paint from the painting head.

17. The painting robot according to claim 6, wherein the feedforward control unit operates the second regulating valve, by correcting the calculated pressure calculation value with the compensating pressure value for correcting the paint recovery means on the side that closes the second regulating valve, based on the trigger signal related to the start of discharge of the paint from the discharge stop state of the paint from the painting head.

18. The painting robot according to claim 6, wherein the feedforward control unit operates the first regulating valve, by correcting the calculated pressure calculation value with the compensating pressure value for correcting the paint recovery means on the side that closes the first regulating valve, based on the trigger signal related to the stoppage of discharge of the paint from the discharge state of the paint from the painting head.

19. The painting robot according to claim 7, wherein the feedforward control unit operates the first regulating valve, by correcting the calculated pressure calculation value with the compensating pressure value for correcting the paint recovery means on the side that closes the first regulating valve, based on the trigger signal related to the stoppage of discharge of the paint from the discharge state of the paint from the painting head.

* * * * *